US012371205B2

(12) United States Patent
Holmes

(10) Patent No.: US 12,371,205 B2
(45) Date of Patent: Jul. 29, 2025

(54) PHARMACY PACKAGING SYSTEM

(71) Applicant: RXSAFE LLC, Vista, CA (US)

(72) Inventor: William K. Holmes, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 0 days.

(21) Appl. No.: 18/185,120

(22) Filed: Mar. 16, 2023

(65) Prior Publication Data

US 2023/0211904 A1 Jul. 6, 2023

Related U.S. Application Data

(63) Continuation of application No. 17/570,267, filed on Jan. 6, 2022, now Pat. No. 11,760,512, which is a (Continued)

(51) Int. Cl.

*B65B 1/02* (2006.01)
*B65B 1/04* (2006.01)
*B65B 7/02* (2006.01)
*B65B 9/02* (2006.01)
*B65B 9/04* (2006.01)
(Continued)

(52) U.S. Cl.

CPC .................. *B65B 1/02* (2013.01); *B65B 1/04* (2013.01); *B65B 7/02* (2013.01); *B65B 9/02* (2013.01); *B65B 9/04* (2013.01); *B65B 9/20* (2013.01); *B65B 41/12* (2013.01); *B65B 57/04* (2013.01); *B65B 57/20* (2013.01); *B65B 61/025* (2013.01); *G07F 11/165* (2013.01); *G07F 11/44* (2013.01); *G07F 11/60* (2013.01); *G07F 17/0092* (2013.01); *B65B 2039/009* (2013.01); *B65B 2220/06* (2013.01)

(58) Field of Classification Search

CPC .... B65B 1/02; B65B 9/02; B65B 9/04; B65B 41/12; B65B 61/025

See application file for complete search history.

(56) References Cited

U.S. PATENT DOCUMENTS 2,208,951 A 7/1940 Tamassy
2,960,808 A 11/1960 Pike
(Continued)

FOREIGN PATENT DOCUMENTS

EP 0947425 A1 10/1999
EP 1707490 A2 10/2006
(Continued)

OTHER PUBLICATIONS

European Patent Office Extended European Search Report for Application No. 23180809.8, dated May 7, 2024 (11 pages).

*Primary Examiner* — Gloria R Weeks

(74) *Attorney, Agent, or Firm* — Michael Best & Friedrich LLP

(57) ABSTRACT

A packaging unit and method for packaging pharmaceuticals into pouches. The packaging unit includes a feed stock roll to form pouches and an electronic processor electrically coupled to the packaging equipment. The electronic processor is configured to determine an amount of pharmaceuticals being loaded into the pouch, determine a length of the pouch based on the amount of pharmaceuticals, and control the packaging equipment to form the pouch having the length.

16 Claims, 18 Drawing Sheets

Related U.S. Application Data continuation of application No. 16/544,168, filed on Aug. 19, 2019, now Pat. No. 11,235,895, which is a continuation of application No. 15/277,500, filed on Sep. 27, 2016, now Pat. No. 10,427,810, which is a continuation-in-part of application No. 13/836,629, filed on Mar. 15, 2013, now Pat. No. 10,427,809.

(60) Provisional application No. 61/654,365, filed on Jun. 1, 2012.

(51) Int. Cl.

| | |
|---|---|
| ***B65B 9/20*** | (2012.01) |
| ***B65B 41/12*** | (2006.01) |
| ***B65B 57/04*** | (2006.01) |
| ***B65B 57/20*** | (2006.01) |
| ***B65B 61/02*** | (2006.01) |
| ***G07F 11/16*** | (2006.01) |
| ***G07F 11/44*** | (2006.01) |
| ***G07F 11/60*** | (2006.01) |
| ***G07F 17/00*** | (2006.01) |
| *B65B 39/00* | (2006.01) |

(56) References Cited

U.S. PATENT DOCUMENTS 3,439,469 A 4/1969 Van Mil, Jr.
3,552,087 A 1/1971 Schneider et al.
4,067,173 A * 1/1978 Borrello .............. B29C 66/8432 53/511
4,493,178 A * 1/1985 Buckner ................... B65B 9/02 53/131.5
4,546,901 A 10/1985 Buttarazzi
4,655,026 A 4/1987 Wigoda
4,703,765 A 11/1987 Paules et al.
4,761,932 A 8/1988 Harvey et al.
5,029,430 A * 7/1991 Davis .................... B65B 55/103 53/554
5,097,652 A * 3/1992 Inamura .................. B65B 35/02 53/238
5,219,095 A 6/1993 Shimizu et al.
5,348,061 A 9/1994 Riley et al.
5,463,839 A 11/1995 Stange et al.
5,481,855 A 1/1996 Yuyama
5,694,741 A 12/1997 Weder et al.
5,716,114 A 2/1998 Holmes et al.
5,765,606 A 6/1998 Takemasa et al.
5,819,500 A * 10/1998 Haraguchi .......... G07F 17/0092 53/238
5,946,883 A 9/1999 Yuyama et al.
6,012,602 A 1/2000 Yuyama et al.
6,036,812 A 3/2000 Williams et al.
6,050,064 A 4/2000 Yuyama et al.
6,119,737 A 9/2000 Yuyama et al.
6,170,230 B1 * 1/2001 Chudy .................... B65B 5/103 53/238
6,170,699 B1 1/2001 Kim
6,256,967 B1 7/2001 Hebron et al.
6,324,253 B1 * 11/2001 Yuyama ................. G01N 23/04 378/57
6,481,180 B1 11/2002 Takahasghi et al.
6,478,041 B1 12/2002 Stede
6,505,457 B2 1/2003 Grass
6,519,914 B1 * 2/2003 Pesho ....................... B65B 9/02 53/553
6,581,355 B1 6/2003 Yuyama et al.
6,598,368 B1 7/2003 Haida
6,772,907 B2 8/2004 Kim
7,028,447 B2 * 4/2006 Sung ...................... B41J 25/308 53/131.5
7,100,792 B2 9/2006 Hunter et al.
7,118,006 B2 10/2006 Williams et al.
7,124,791 B2 10/2006 Geltser et al.
7,182,105 B1 2/2007 Feehan et al.
7,383,862 B2 6/2008 Geltser et al.
7,386,970 B2 6/2008 Richwine
7,428,805 B2 9/2008 Kim
7,536,938 B2 * 5/2009 Kim ........................ B65B 61/06 83/209
7,549,268 B2 * 6/2009 Kim .................... G07F 17/0092 53/503
7,562,791 B2 7/2009 Silverbrook et al.
7,637,078 B2 12/2009 Ishlwatari et al.
7,818,947 B2 10/2010 Kim
7,856,794 B2 12/2010 Zieher
7,878,366 B2 2/2011 Cicognani
7,886,508 B2 2/2011 Yuyama et al.
7,894,656 B2 2/2011 Kim
8,096,100 B2 1/2012 Greenwald et al.
8,122,689 B2 * 2/2012 Pape ......................... F25C 5/24 62/344
8,146,777 B2 4/2012 Inamura
8,186,542 B2 5/2012 Kobayashi et al.
8,234,838 B2 8/2012 Yasunaga
8,627,639 B2 * 1/2014 Ali .......................... B65B 5/103 53/473
8,678,231 B2 3/2014 Yuyama et al.
8,794,273 B2 8/2014 Ansaloni et al.
8,896,322 B2 11/2014 Rivenbark, Jr.
9,272,796 B1 * 3/2016 Chudy ............... G01N 21/9508
10,187,593 B2 1/2019 Holmes
10,315,785 B2 6/2019 Rea et al.
10,427,809 B2 10/2019 Holmes
10,427,810 B2 * 10/2019 Holmes ................. G07F 11/165
10,696,437 B2 6/2020 Persson
10,722,430 B1 7/2020 Arora
11,235,895 B2 2/2022 Holmes
2003/0056467 A1 3/2003 Kim
2003/0057231 A1 3/2003 Kim
2003/0188517 A1 * 10/2003 Paradissis ......... B29C 66/83517 53/201
2006/0259195 A1 11/2006 Eliuk et al.
2007/0151204 A1 7/2007 Kim
2007/0186514 A1 8/2007 Vollm et al.
2008/0307757 A1 12/2008 Heim et al.
2009/0205291 A1 8/2009 Antonevich et al.
2009/0255948 A1 10/2009 Bassani
2009/0272758 A1 11/2009 Karwacki, Jr. et al.
2009/0308964 A1 12/2009 Chudy et al.
2010/0011715 A1 1/2010 Freudelsperger
2010/0042255 A1 2/2010 Boutin
2010/0050570 A1 3/2010 Mori et al.
2010/0059069 A1 3/2010 Boldrini
2010/0071320 A1 3/2010 Ali et al.
2010/0071711 A1 3/2010 Boldrini
2010/0077707 A1 * 4/2010 Kondo .................... B65B 5/103 53/493
2010/0077708 A1 4/2010 Kobayashi et al.
2010/0115892 A1 5/2010 Aylward et al.
2010/0168910 A1 7/2010 Haas
2010/0287880 A1 11/2010 Yasunaga et al.
2011/0054668 A1 3/2011 Holmes et al.
2012/0096807 A1 4/2012 Okuma
2013/0299381 A9 * 11/2013 Luciano, Jr. .............. A61J 1/03 53/473
2013/0318915 A1 12/2013 Iskarous et al.
2013/0318931 A1 12/2013 Holmes
2014/0245697 A1 9/2014 Omura et al.
2014/0298754 A1 10/2014 Van Wijngaarden
2014/0318078 A1 10/2014 Kondo et al.
2017/0015445 A1 1/2017 Holmes
2017/0057682 A1 3/2017 Chudy
2017/0305589 A1 10/2017 Yuyama et al.
2018/0318167 A1 11/2018 Luciano, Jr. et al.
2019/0112080 A1 4/2019 Holmes
2020/0317382 A1 10/2020 Savoie-Lavigueur et al.
2020/0331641 A1 10/2020 Yuyuma

(56) References Cited

U.S. PATENT DOCUMENTS

FOREIGN PATENT DOCUMENTS

| | | | |
|---|---|---|---|
| EP | 1728718 | A1 | 12/2006 |
| JP | 57-043818 | S | 3/1982 |
| JP | 60116355 | A | 6/1985 |
| JP | 09202301 | A | 8/1997 |
| JP | H11206854 | A | 8/1999 |
| JP | 2005053538 | A | 3/2005 |
| JP | 2006321516 | A | 11/2006 |
| JP | 2007084073 | A | 4/2007 |
| JP | 2012-131574 | A | 7/2012 |
| JP | 2014118166 | A | 6/2014 |
| JP | 2014230744 | A | 12/2014 |
| JP | 2017-164560 | A | 9/2017 |
| JP | 2018027345 | A | 2/2018 |
| WO | 9929467 | A2 | 6/1999 |
| WO | 2010077797 | A1 | 7/2010 |
| WO | 2011055037 | A2 | 5/2011 |

* cited by examiner

PHARMACY PACKAGING SYSTEM

CROSS-REFERENCE TO RELATED APPLICATIONS

This application is a continuation of U.S. patent application Ser. No. 17/570,267 filed Jan. 6, 2022, which is a continuation application of U.S. patent application Ser. No. 16/544,168, filed on Aug. 19, 2019, now U.S. Pat. No. 11,235,895, which is a continuation-in-part of U.S. patent application Ser. No. 15/277,500, filed on Sep. 27, 2016, now U.S. Pat. No. 10,427,810, which is a continuation-in-part of U.S. patent application Ser. No. 13/836,629, filed Mar. 15, 2013, now U.S. Pat. No. 10,427,809, which claims priority to U.S. Provisional Patent Application No. 61/654,365, filed Jun. 1, 2012, the entire contents of all of which are incorporated by reference herein.

FIELD OF THE INVENTION

The present invention relates to packaging systems and, more particularly, to systems for storing, retrieving, and packaging pharmaceuticals.

SUMMARY

In one embodiment, the invention provides a system for storing and packaging pharmaceuticals. The system includes a frame configured to store canisters that contain pharmaceuticals and a canister-moving assembly coupled to the frame. The canister-moving assembly is operable to move relative to the frame to retrieve the canisters from the frame. The system also includes a dispensing area positioned adjacent the frame to receive the canisters from the canister-moving assembly. The dispensing area is operable to selectively operate the canisters. The system further includes packaging equipment in communication with the dispensing area. The packaging equipment includes a feed stock roll for forming pouches. The packaging equipment is operable to fill the pouches with pharmaceuticals that are dispensed from the canisters in the dispensing area. The system also includes a control system coupled to the canister-moving assembly and the packaging equipment to control operation of the canister-moving assembly and the packaging equipment.

In another embodiment, the invention provides a system for storing and retrieving pharmaceuticals. The system includes a storage unit having a frame configured to store canisters that contain pharmaceuticals and a canister-moving assembly coupled to the frame. The canister-moving assembly is operable to move relative to the frame to retrieve the canisters from the frame. The system also includes a packaging unit having a dispensing area positioned adjacent the frame of the storage unit to receive the canisters from the canister-moving assembly. The dispensing area is operable to selectively operate the canisters. The packaging unit also has packaging equipment operable to package pharmaceuticals that are dispensed from the canisters in the dispensing area and a manifold extending from the dispensing area to direct pharmaceuticals that are dispensed from the canisters toward the packaging equipment.

In yet another embodiment, the invention provides a packaging unit for packaging pharmaceuticals into a pouch. The packaging unit includes packaging equipment operable to form the pouch, a track configured to direct the pharmaceuticals toward the packaging equipment, and a receptacle coupled to the track upstream of the packaging equipment to receive the pharmaceuticals from the track. The receptacle includes a valve mechanism that is movable relative to the track to push the pharmaceuticals into the pouch.

In still another embodiment, the invention provides a method of packaging pharmaceuticals into a pouch using a packaging unit. The packaging unit includes packaging equipment, a track configured to direct the pharmaceuticals toward the packaging equipment, and a receptacle coupled to the track upstream of the packaging equipment. The receptacle includes a valve mechanism. The method includes forming the pouch with the packaging equipment, directing the pharmaceuticals along the track toward the packaging equipment while the valve mechanism is in a raised position, receiving the pharmaceuticals from the track in the pouch, and lowering the valve mechanism to push the pharmaceuticals into the pouch.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
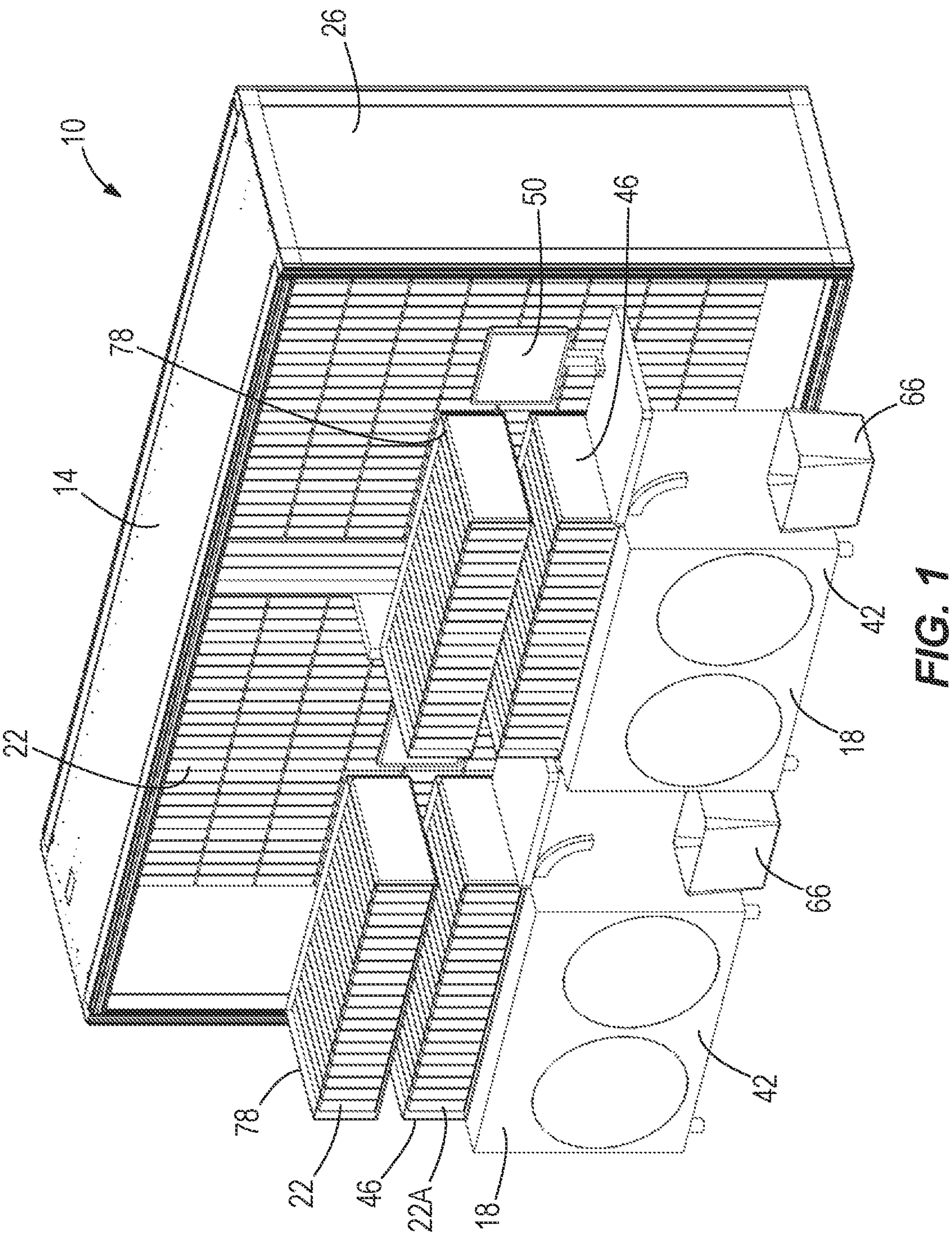
FIG. 1 is a perspective view of a pharmacy packaging system according to one embodiment of the invention.
Figure 2:
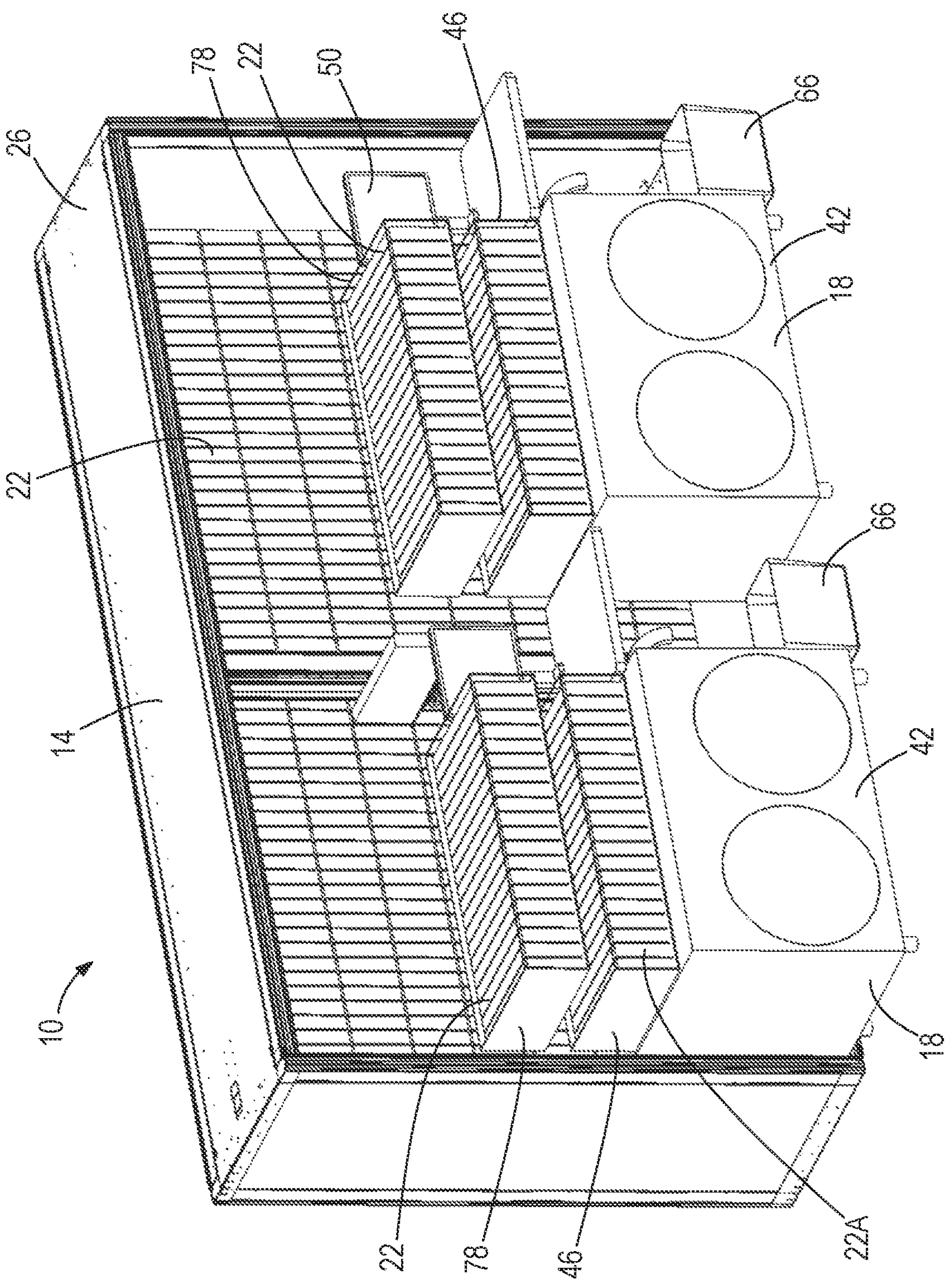
FIG. 2 is another perspective view of the pharmacy packaging system shown in FIG. 1.

FIGS. 1 and 2 illustrate a pharmacy packaging system 10 embodying the invention. The illustrated system 10 is a self-contained system that stores, retrieves, and packages pharmaceuticals (e.g., pills, drugs, narcotics, or other medications). Pharmaceuticals may also include nutraceuticals and other types of substances. The system 10 securely stores all of the pharmaceuticals required by a facility in an organized manner. In addition, the system 10 allows a user to retrieve different combinations of those pharmaceuticals through an automated process. In some embodiments, the system 10 can be placed in a facility (e.g., a closed-door pharmacy) that supplies packaged pharmaceuticals to multiple locations. In other embodiments, the system 10 can be placed in a consumer pharmacy or in other locations where a variety of different pharmaceuticals are distributed directly to multiple patients on a regular basis, such as in a nursing home, a hospital, a correctional facility, a home residence, or the like.

In the illustrated embodiment, the system 10 includes a storage unit 14 and two automatic packaging units 18. The storage unit 14 stores a plurality of canisters 22, or containers or cassettes, containing a variety of pharmaceuticals. The packaging units 18 package pharmaceuticals from those canisters 22 into pouches for distribution to patients. In some embodiments, the system 10 may include fewer or more packaging units 18. Additionally or alternatively, the packaging units 18 may be positioned on both sides of the storage unit 14. For example, the system 10 may include four packaging units 18, with two units 18 positioned on each side of the storage unit 14. Such an arrangement allows multiple, independent packaging units 18 to access the same pharmaceutical array.

Figure 3:
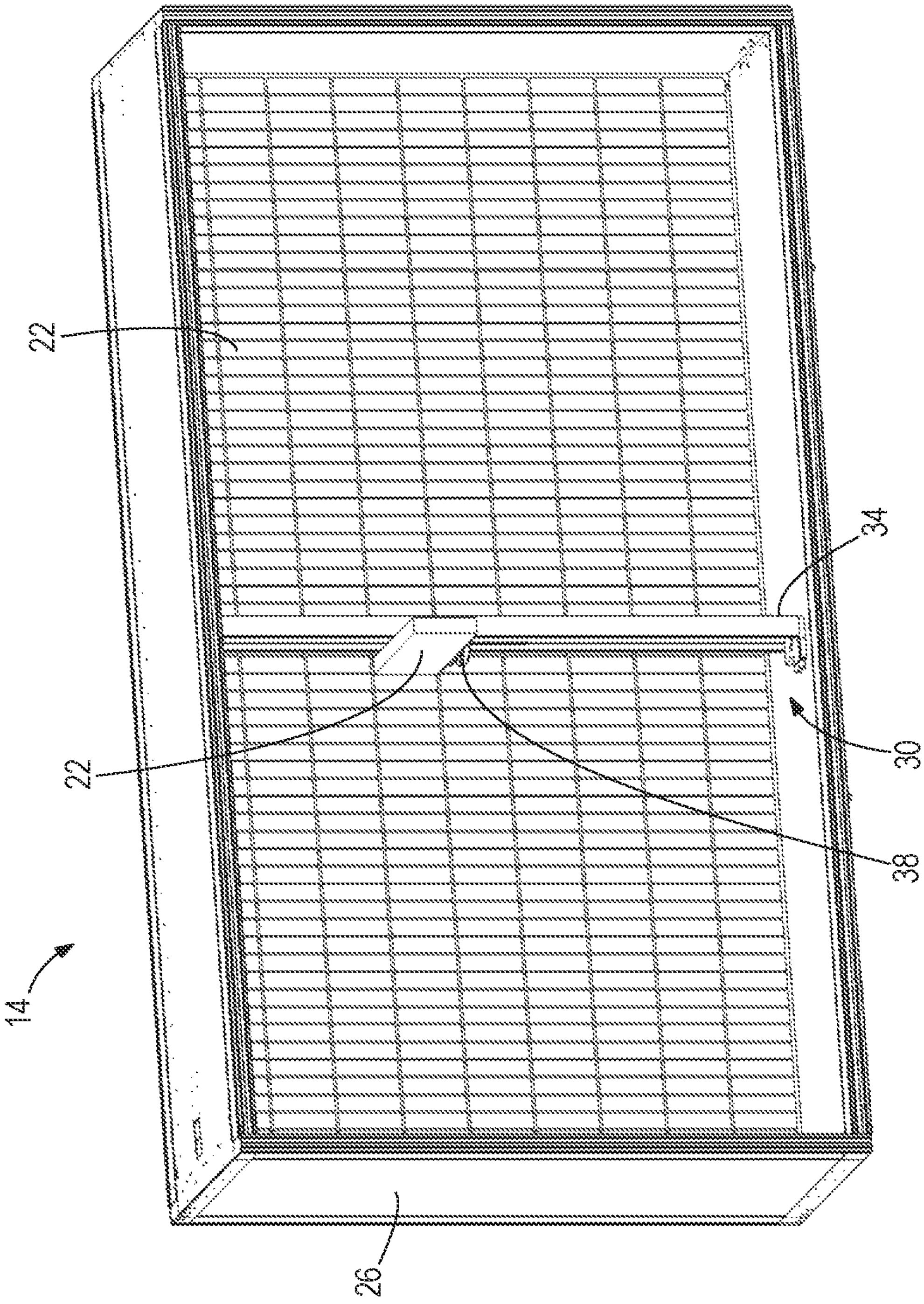
FIG. 3 is a perspective view of a storage unit of the pharmacy packaging system shown in FIG. 1.

As shown in FIG. 3, the storage unit 14 includes a frame 26 and a gantry assembly 30. The frame 26 includes a plurality of shelves or other supports for storing the canisters 22 in an array of rows and columns. Each canister 22 is uniformly shaped and sized and may contain pharmaceuticals of the same or different type compared to other canisters 22. In some embodiments, the frame 26 may be, for example, about fourteen feet wide by six feet tall by four feet deep and may store up to 1000 individual canisters 22. In other embodiments, the frame 26 may be larger or smaller for storing fewer or more canisters 22, as needed by a particular facility.

The gantry assembly 30 is coupled to the frame 26 for retrieving canisters 22 from within the frame 26. The gantry assembly 30 is a canister-moving assembly that is operable to move the canisters 22 within the frame 26. The illustrated gantry assembly 30 is similar to the gantry assembly disclosed in U.S. patent application Ser. No. 12/870,045, filed Aug. 27, 2010 and published as U.S. Patent Application Publication No. 2011/0054668, the entire contents of which are incorporated by reference herein. The gantry assembly 30 includes a track 34 and a robotic head 38 that is operable to move along the track 34 to retrieve the canisters 22. The track 34 is movable horizontally within the frame 26 to align the robotic head 38 with a specific column of canisters 22. The robotic head 38, or carriage assembly, is movable vertically along the track 34 to align with a specific row of canisters 22. When the robotic head 38 is aligned with the desired canister 22, the head 38 grabs the canister 22 and carries the canister 22 to one of the automatic packaging units 18, as further described below. The robotic head 38 can also retrieve a canister 22 from the packaging unit 18 and return the canister 22 to the proper column and row within the frame 26. In some embodiments, the canisters 22 may not be assigned the same location. In these embodiments, the robotic head 38 may retrieve a canister 22 from the packaging unit 18 and return the canister 22 to a random location. The packaging unit 18 may then store the new location of the canister 22. In some embodiments, a return location of the canister 22 may be determined based on, for example, the frequency of use the canister 22, the size of the canister 22, or the like.

Figure 4:
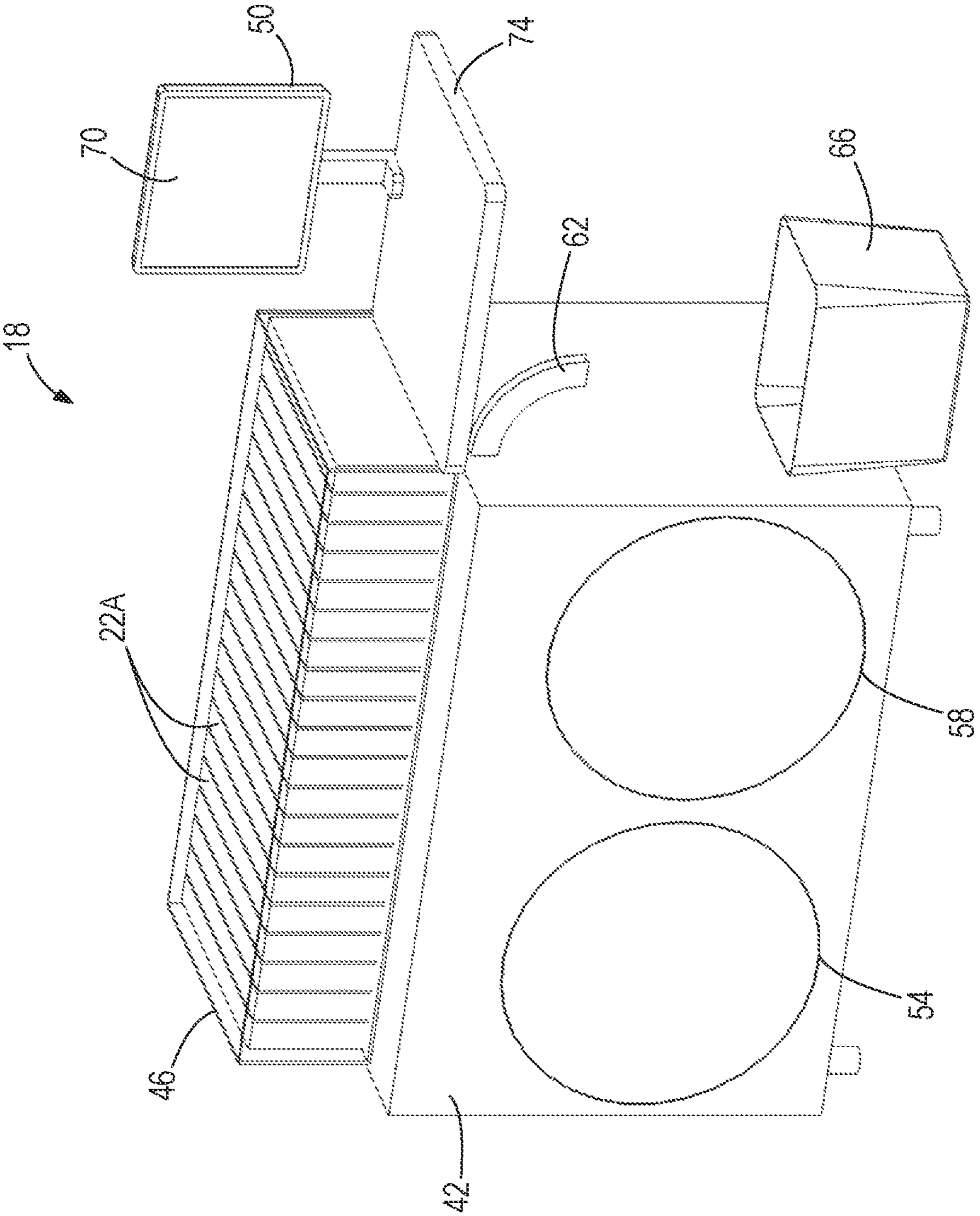
FIG. 4 is a perspective view of an automatic packaging unit of the pharmacy packaging system shown in FIG. 1.

FIG. 4 illustrates one of the automatic packaging units 18. The packaging unit 18 includes a cabinet 42, a dispensing area 46, and a control system 50. The illustrated cabinet 42 may be about two feet deep such that the entire system 10 is about six feet deep with a packaging unit 18 on each side of the frame 26. The cabinet 42 contains equipment for packaging pharmaceuticals into pouches. In the illustrated embodiment, the packaging equipment includes a feed stock roll 54 and a take-up roll 58 that are positioned within the cabinet 42. The feed stock roll 54 unrolls the pouches, which are then filled with pharmaceuticals from the canisters 22A in the dispensing area 46. The pouch is run along a track underneath all of the active canisters 22A and filled with the requested number and type of pharmaceuticals from the appropriate canisters 22A. Such an arrangement reduces the possibility of cross-contamination between the canisters 22A and, thereby, the pharmaceuticals. Once a pouch is filled, the pouch is discharged from the cabinet 42 through an outlet 62. In the illustrated embodiment, the outlet 62 drops the filled pouches into a tote 66 so the pouches can be retrieved by a user. In other embodiments, the packaging equipment may be configured to package the pharmaceuticals into blister packs, pharmacy vials, or other suitable containers.

In some embodiments, the packaging units 18 may include rollers, castors, or other types of wheels. The wheels allow a user to roll the packaging units 18 toward and away from the storage unit 14 in a modular fashion. Such an arrangement provides redundancy by allowing each of the units 18 to quickly and easily be replaced. In addition, the packaging units 18 may be interchanged if pharmaceuticals need to be packaged in a different size and/or type of packaging container.

The illustrated dispensing area 46 is positioned on top of the cabinet 42 adjacent the frame 26 of the storage unit 14. The dispensing area 46 temporarily stores a series of active canisters 22A that are used to fill the pouches within the cabinet 42. In the illustrated embodiment, the dispensing area 46 stores up to twenty active canisters 22A at a time. Such an arrangement allows a pouch to be filled with twenty different types of pharmaceuticals. In other embodiments, the dispensing area 46 may store fewer or more active canisters 22A. The illustrated dispensing area 46 includes motors and sensors that are temporarily connected to each of the active canisters 22A. For example, one motor and one sensor may electrically connect to each active canister 22A to selectively open and close the canister 22A and to monitor the amount (e.g., number, volume, etc.) of pharmaceuticals being dispensed from the canister 22A. In particular, the motor of the dispensing area 46 rotates a rotor within the corresponding canister 22A to selectively dispense pharmaceuticals out of the canister 22A. In some embodiments, selectively operating the canister 22A includes rotating a base of the canister 22A to dispense a pharmaceutical through an opening. When operated, the canisters 22A drop pharmaceuticals into the pouches. In the illustrated embodiment, the pharmaceuticals are dispensed from the canisters 22A via gravity. In other embodiments, the packaging equipment may generate a vacuum to draw the pharmaceuticals out of the canisters 22A. Metering devices may also be coupled to each active canister 22A to help control the amount of pharmaceuticals being dispensed.

In some embodiments, the automatic packaging unit 18 may include an inspection device that inspects the pharmaceuticals before they are packaged in the pouches. After the pharmaceuticals come out of the active canisters 22A, the pharmaceuticals may be temporarily collected in an intermediate catch basin. A sensor (e.g., a camera, etc.) may inspect the pharmaceuticals in the basin based on, for example, color, shape, infrared images, shape recognition, or pill imprints. The sensor may alternatively inspect the pharmaceuticals with spectrography, magnetic resonance, or the like. Once the pharmaceuticals are verified, the pharmaceuticals can be released from the basin into the corresponding pouch. Inspection of the pharmaceuticals may be entirely automated or may involve a person (e.g., a remote operator who views images of the pharmaceuticals).

The control system 50 is electrically coupled to the packaging equipment and the gantry assembly 30 to control operation of the packaging system 10. In particular, the control system 50 coordinates movement of the gantry assembly 30 to move the canisters 22 between the storage unit 14 and the packaging unit 18, controls operation of the feed stock roll 54 to release a pouch, and controls when the active canisters 22A positioned in the dispensing area 46 are operated. The illustrated control system 50 includes a monitor 70 mounted to a shelf 74 that extends from the cabinet 42. The control system 50 may also include a processor, a memory, and an input device (e.g., a keyboard) that allows a user to interface with the system 50. In some embodiments, the monitor 70 may include a touch screen.

Referring back to FIGS. 1 and 2, during operation, a user interacts with the packaging system 10 through the control systems 50 on the packaging units 18. The user may input the name of a patient and/or a particular combination of pharmaceuticals needed. Once the necessary data is inputted, the gantry assembly 30 moves relative to the frame 26 to retrieve the proper canisters 22 from the storage unit 14 and carry the canisters 22 to the dispensing area 46. In the illustrated embodiment, the robotic head 38 of the gantry assembly 30 carries one canister 22 at a time, but alternates between carrying a canister 22 to the dispensing area 46 and removing a canister 22 from the dispensing area 46, thereby limiting excess movements of the gantry assembly 30. In some embodiments, the packaging system 10 may include more than one robotic head 38 or more than one gantry assembly 30. In these embodiments, multiple canisters 22 may be carried at a time between the storage unit 14 and the dispensing area 46. In some embodiments, a user interacts with the packaging system 10 via a remote device (e.g., a tablet, smart phone, laptop, or client computer) that enables the user to remotely control or otherwise interact with the packaging system 10.

After the proper canisters 22 are positioned in the dispensing area, the packaging equipment within the cabinet 42 fills a pouch with the desired pharmaceuticals. For example, a strip of pouches may be filled with a week's supply of assorted pharmaceuticals for a particular patient. By connecting two packaging units 18 to the storage unit 14, a user (or multiple users) can simultaneously input data and fill two strips of pouches with pharmaceuticals for different patients. In some embodiments, the packaging equipment may include a printer to print a patient's name, the date, the amount and type of pharmaceuticals contained within, a bar code, or other indicia on the pouches. Once a pouch is filled and labeled, the pouch is dropped into the corresponding tote 66.

As the pouches are being filled, the control system 50 tracks and monitors the amount and types of pharmaceuticals within the system 10. For example, the control system 50 can verify that a user is authorized to retrieve certain pharmaceuticals, that a patient has a prescription for a particular pharmaceutical, and the quantity of pharmaceuticals remaining in each canister 22. The control system 50 can also track where a particular canister of pharmaceuticals is positioned within the system 10 (i.e., whether the canister 22 is currently stored in the storage unit 14 or one of the dispensing areas 46, and in which row and column of the frame 26 the canister 22 belongs).

In some embodiments, the filling of orders can be optimized by the control system 50. For example, a user can input all of the orders that need to be filled by the system 10 in a given day. The control system 10 can then determine in which order to process those orders to minimize the number of times the canisters 22 move between the storage unit 14 and the dispensing areas 46 of the packaging units 18. In other embodiments, the control system 50 may optimize the orders such that all of the orders for a particular patient or facility are filled consecutively. In further embodiments, the user may program the control system 50 so that a particular order is filled immediately and/or the orders are filled in the order in which they were requested.

In still further embodiments, the control system 50 can be programmed to fill a spool of pouches with the same drug or other pharmaceutical. For example, the control system 50 can fill a series of 50 to 500 pouches with an individual drug or narcotic for pharmacies, nursing homes, hospitals, or other facilities to keep as stock drugs in emergency drug kits.

As shown in FIGS. 1 and 2, the packaging system 10 also includes two refill areas 78 positioned above the dispensing areas 46 of the packaging units 18. In other embodiments, the system 10 may only include a single refill area and/or the refill areas 78 may be positioned in different locations relative to the packaging units 18. The refill areas 78 may be manually stocked with canisters 22 by a user. When one of the canisters 22 stored within the storage unit 14 is depleted, the gantry assembly 30 can remove the empty canister, place that canister in the refill area 78, and grab a replacement canister from the refill area 78. The gantry assembly 30 can then position the replacement canister in the proper row and column within the frame 26. In some embodiments, the control system 50 can alert a user when a particular canister 22 is empty or near empty so that the user can place a suitable replacement canister 22 within the refill area 78 and input information notifying the system 50 of the replacement canister 22.

The illustrated packaging system 10 increases the speed at which pouches of pharmaceuticals can be filled at an on-site facility and reduces the possibility of errors when filling those pouches. In the illustrated embodiment, the system 10 can achieve a throughput of up to sixty pouches per minute, including verification, for each automatic packaging unit 18 included in the system 10. The automated system 10 also avoids cross-contamination caused by mixing pharmaceuticals between pouches through a common pathway. In some embodiments, the packaging equipment generates vacuum to remove dust and clean the pathways. In other embodiments, the packing system may use designate certain pathways to certain pharmaceuticals to reduce or eliminate cross-contamination.

In some embodiments, the automatic packaging units 18 may operate separately from the storage unit 14. In such embodiments, each packaging unit 18 may be a standalone packaging system for use in smaller pharmacies or other low-volume facilities. In addition, the dispensing areas 46 of the packaging units 18 may be manually loaded, as needed, to fill specific pharmaceutical orders.

Figure 7:
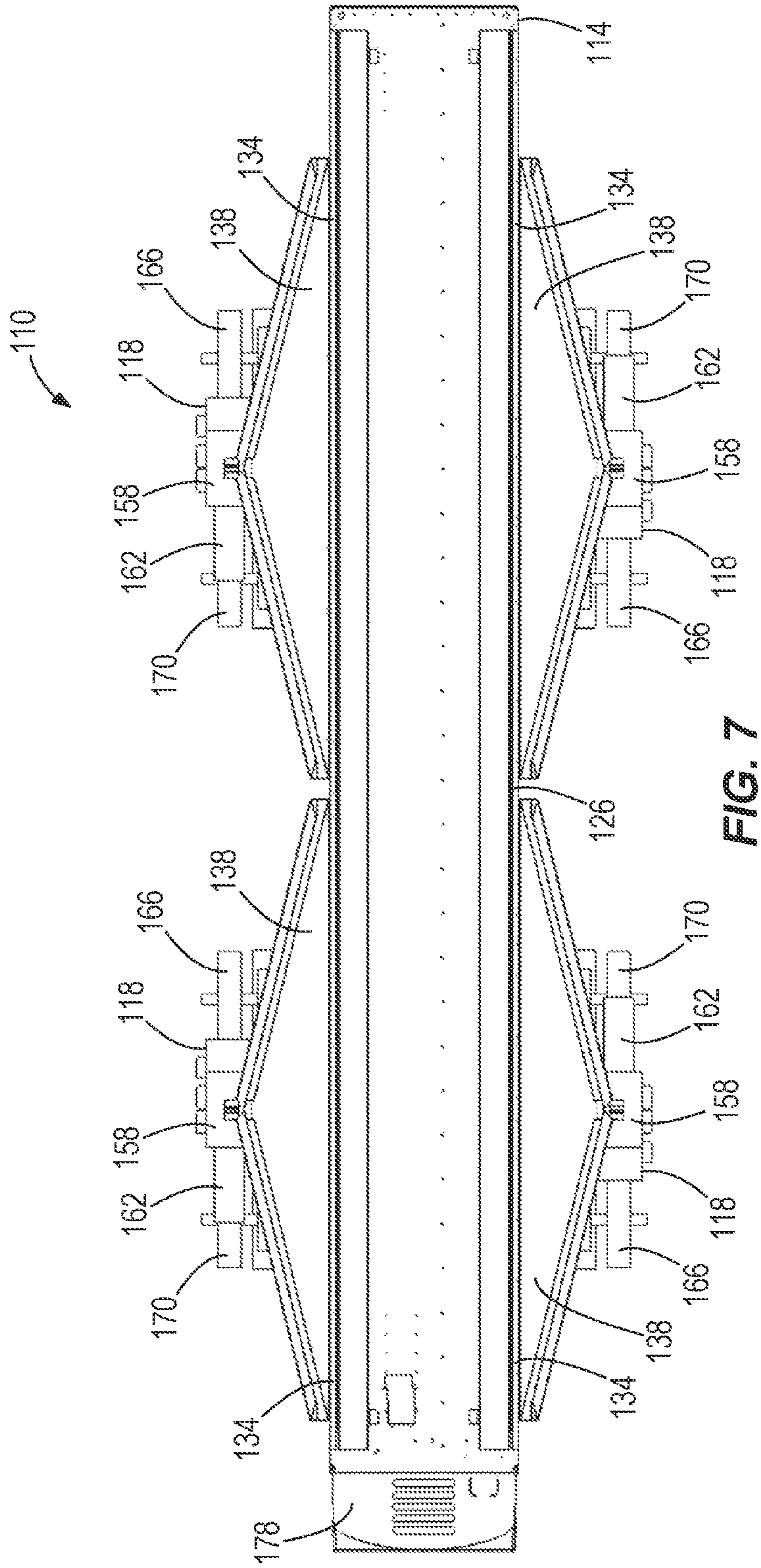
FIG. 7 is a top view of the pharmacy packaging system shown in FIG. 5.

FIGS. 5-9 illustrate a pharmacy packaging system 110 according to another embodiment of the invention. Similar to the packaging system 10 discussed above with reference to FIGS. 1-4, the illustrated packaging system 110 includes a storage unit 114 and multiple automatic packaging units 118. As shown in FIG. 7, the packaging system 110 includes four packaging units 118, with two units 118 positioned adjacent each side of the storage unit 114 to access canisters 122. In other embodiments, the packaging system 110 may include fewer or more packaging units 118.

Referring back to FIGS. 5 and 6, the storage unit 114 includes a frame 126 and a gantry assembly 130. The frame 126 includes a plurality of shelves for storing the canisters 122 in an array of rows and columns. In some embodiments, panels may be coupled to and extend across the frame 126 to enclose the frame 126 such that the canisters 122 are secured within the system 110. The illustrated canisters 122 are non-motorized canisters suitable for storing pharmaceuticals. The gantry assembly 130, or canister-moving assembly, is similar to the gantry assembly 30 discussed above and can move along the frame 126 to retrieve the canisters 122. In the illustrated embodiment, the gantry assembly 130 is positioned between two arrays, or stacks, of canisters 122 such that the gantry assembly 130 can access the canisters 122 on both sides of the storage unit 114.

Each packaging unit 114 includes a motor base 134 positioned adjacent the frame 126 of the storage unit 114 and a manifold 138 coupled to and extending from the motor base 134. The motor bases 134 are offset from the other shelves of the frame 126 and include ledges 142 for supporting active canisters 122A. The illustrated motor bases 134 are only offset from the other shelves a relatively short distance to reduce the range of horizontal movement required by the gantry assembly 130 to place canisters 122 on or remove canisters 122 from the ledges 142. In the illustrated embodiment, each motor base 134 supports up to twenty active canisters 122A at a time in a single, horizontal row. In other embodiments, each motor base 134 may support fewer or more active canisters 122A and/or the motor bases 134 may be configured to support the active canisters 122A in multiple rows (e.g., two rows of ten, three rows of seven, etc.). Each motor base 134 includes one or more motors operable to operate the active canisters 122A to dispense the pharmaceuticals stored within the canisters 122A. The motor bases 134 thereby provide dispensing areas for the active canisters 122A.

Figure 5:
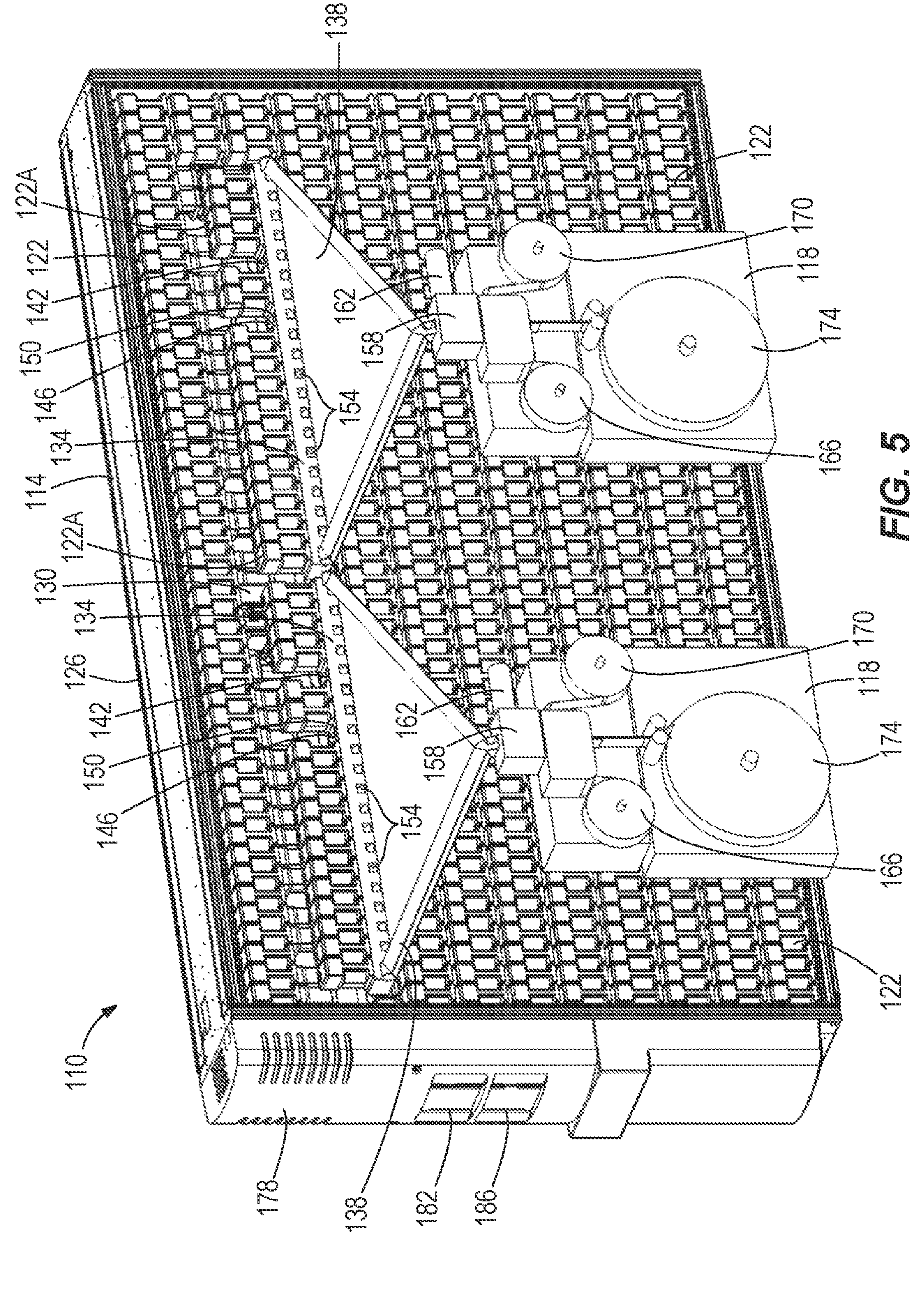
FIG. 5 is a perspective view of a pharmacy packaging system according to another embodiment of the invention.
Figure 6:
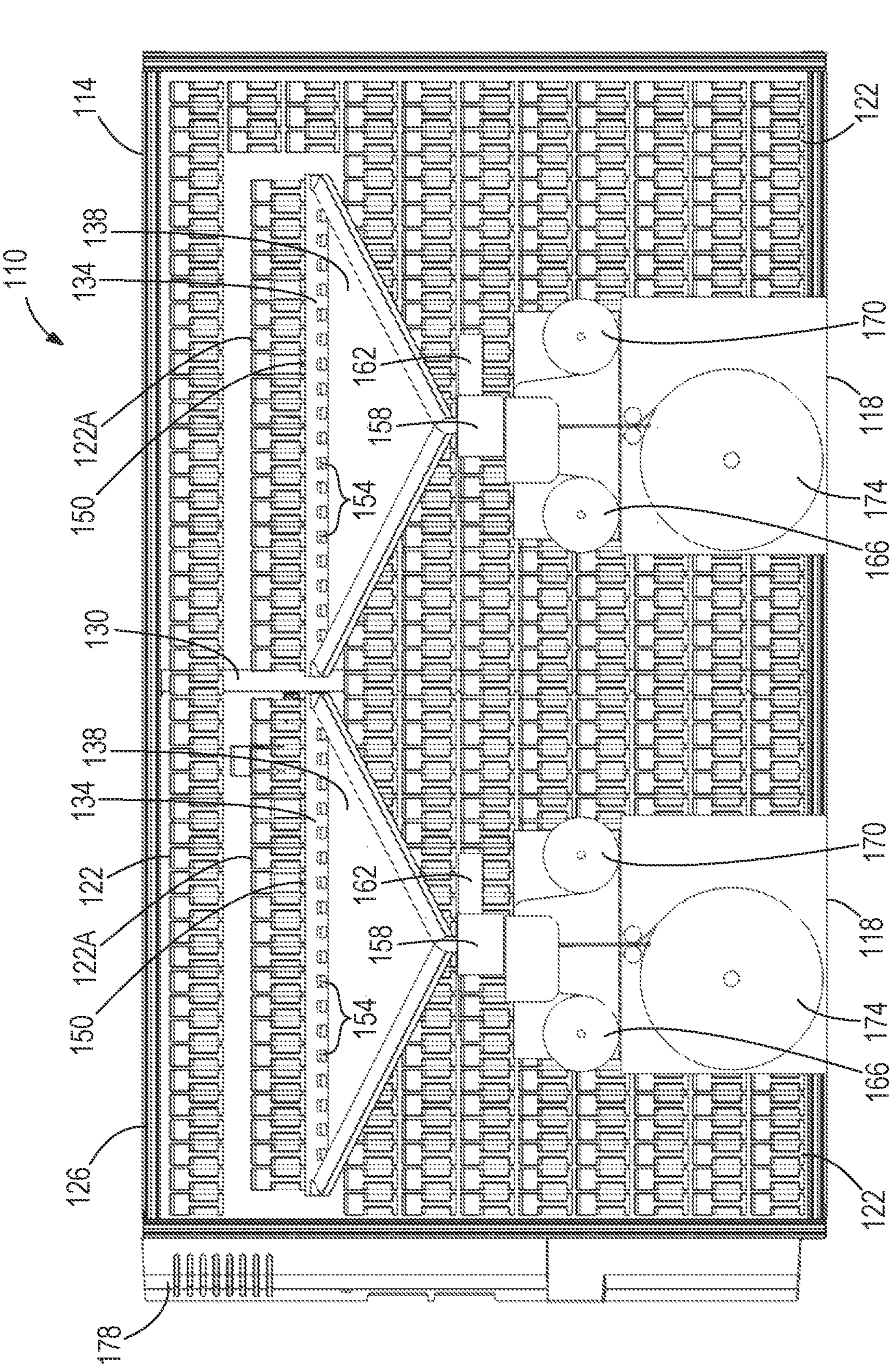
FIG. 6 is a side view of the pharmacy packaging system shown in FIG. 5.

As shown in FIG. 5, the motor bases 134 define openings 146, or inlets, in the ledge 142 that correspond to the active canisters 122A. The motor bases 134 also include a switch 150 adjacent each opening 146. When a canister 122A is positioned on the ledge 142, the canister 122A communicates with the opening 146 and activates the switch 150. The switch 150 indicates to the motor base 134 that a canister is currently positioned on the ledge 142. The motors in the motor base 134 can then operate the canister 122A (e.g., by rotating a disk on the bottom of the canister 122A) to dispense pharmaceuticals into the opening 146. In some embodiments, an infrared beam may detect when pharmaceuticals pass through each of the openings 146. The pharmaceuticals travel through the motor base 134 and are ejected through an outlet 154 formed in a face of the motor base 134. The outlets 154 dispense the pharmaceuticals from the motor base 134 into the corresponding manifold 138.

The manifold 138 directs pharmaceuticals from the motor base 134 toward packaging equipment of the corresponding packaging unit 118. The motor bases 134 are positioned generally above the packaging equipment such that pharmaceuticals slide down the manifold 138 toward the packaging equipment. In the illustrated embodiment, the manifolds 138 are funnels or chutes that are generally triangular and may be formed of, for example, stainless steel. In some embodiments, each manifold 138 may include a cover to inhibit pharmaceuticals from bouncing out of the manifold 138. In such embodiments, the cover may be formed of, for example, clear plastic to help visually monitor operation of the system 110. In addition, the cover may be easily liftable or otherwise separable from the manifold 138 to facilitate cleaning the manifold 138. In some embodiments, each manifold 138 may include discrete tracks (e.g., raceways or pathways) to direct pharmaceuticals from the corresponding outlets 154 in the motor base 134 toward the packaging equipment.

The packaging equipment of the automatic packaging units 118 collect the pharmaceuticals from the manifolds 138 and package the pharmaceuticals into pouches. In the illustrated embodiment, each packaging unit 118 includes a receptacle 158 that communicates with the corresponding manifold 138. The receptacle 158 collects all of the desired pharmaceuticals from the different active canisters 122A before delivering the pharmaceuticals in a single group to the packaging equipment. A camera 162 is coupled to the receptacle 158 to take photographs of the pharmaceuticals as the pharmaceuticals pass into the packaging equipment. In some embodiments, multiple cameras may be coupled to the receptacle 158 to take photographs of the pharmaceuticals from different reference angles. The photographs can be checked by a computer and/or a pharmacist remotely or on-site to verify that the correct pharmaceuticals are being packaged.

In other embodiments, a camera (or other sensor) may be positioned at each outlet 154 in the motor base 134. In such embodiments, the camera can look at a pill from its origin and determine whether the correct pharmaceutical is being dispensed by comparing an image of the pharmaceutical to a stored image of the expected pharmaceutical. For example, the camera can compare a pill's color, contour, shape, size, and/or inscription to the color, contour, shape, size, and/or inscription of a known pill.

In the illustrated embodiment, the packaging equipment of each packaging unit 118 includes two feed stock rolls 166, 170 and a take-up roll 174. After the pharmaceuticals pass through the receptacle 158, the pharmaceuticals are sandwiched between two strips of material (e.g., plastic) from the feed stock rolls 166, 170. The strips of material are then heat sealed together to form a pouch for the pharmaceuticals. In some embodiments, such as the embodiment shown in FIGS. 10-15 and described below, each receptacle 158 may include a shutter or valve mechanism that temporarily stops the pharmaceuticals before they are captured in a pouch. Once formed, the pouches are wrapped around the take-up roll 174 to create a single spool of pouches. In some embodiments, a camera (or other sensor) may be positioned upstream of the take-up roll 174 to verify, for example, that the correct number of pharmaceuticals are packaged within each pouch. The spool may correspond to pharmaceuticals requested by a particular patient or a particular facility. In other embodiments, the pouches may be cut and separated as they are filled, rather than spooled onto the take-up roll 174 continuously.

In some embodiments, the packaging units 118 may include equipment for packaging pharmaceuticals in a blister pack or card, rather than a pouch. Alternatively, the packaging units 118 may include equipment for packaging pharmaceuticals in a pharmacy vial. In such embodiments, the feed stock rolls 166, 170 and the take-up roll 174 may be removed and replaced with other suitable packaging equipment. Furthermore, the packaging system 110 may include a variety of different packaging units 118 to package the pharmaceuticals into a combination of pouches, blister cards, and/or pharmacy vials. In some embodiments, pharmaceuticals may be packaged into different types of packaging containers at the same time by using the packaging units 118 having different types of packaging equipment.

In some embodiments, each packaging unit 118 may include a printer to print a patient's name, the date, the amount and type of pharmaceuticals contained within, a bar code, and/or other indicia on the pouches as the pouches are formed. The printer may be, for example, a thermal printer. In other embodiments, the printer may include an ink ribbon or an ink jet. In addition, each packaging unit 118 may include a bar code scanner or vision system to monitor and check the pouches as they are spooled onto the take-up roll 174 or cut.

In some embodiments, the packaging units 118 may include rollers, castors, or other types of wheels. The wheels allow a user to roll the packaging units 118 toward and away from the storage unit 114 in a modular fashion. In the illustrated embodiment, the packaging units 118 can be easily connected to the storage unit 114 by aligning the motor bases 134 with designated areas of the frame 126. When the units 114, 118 are connected, a single control system can communicate with the storage unit 114 to control operation of the gantry assembly 130 and with the packaging units 118 to control operation of the packaging equipment. Such an arrangement allows the packaging units 118 to be quickly exchanged to package pharmaceuticals in different types and/or sizes of pouches or for maintenance.

The illustrated packaging system 110 includes a control system that functions in a similar manner to the control system 50 discussed above. A user can interact with the packaging system 110 through the control system to input patient information, facility information, and/or the pharmaceuticals needed. The control system can control movement of the gantry assembly 130 to move canisters 122 from the shelves of the storage unit 114 to one of the motor bases 134. In addition, the control system can control operation of the motor bases 134 to selectively operate the active canisters 122A. Furthermore, the control system may optimize orders by minimizing movement of the gantry assembly 130 and canisters 122 or by filling all the orders for a particular patient or facility consecutively.

Figure 8:
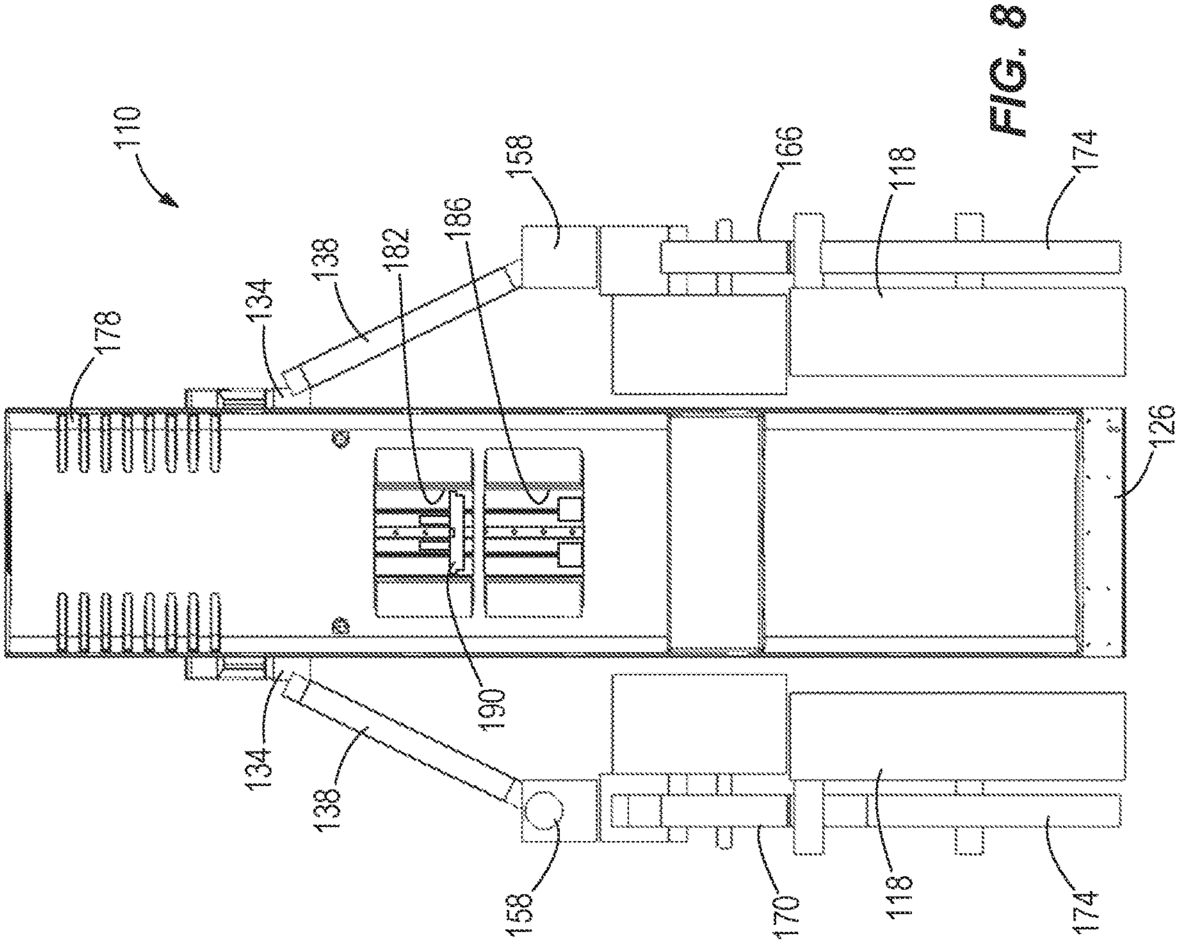
FIG. 8 is a front view of the pharmacy packaging system shown in FIG. 5.
Figure 9:
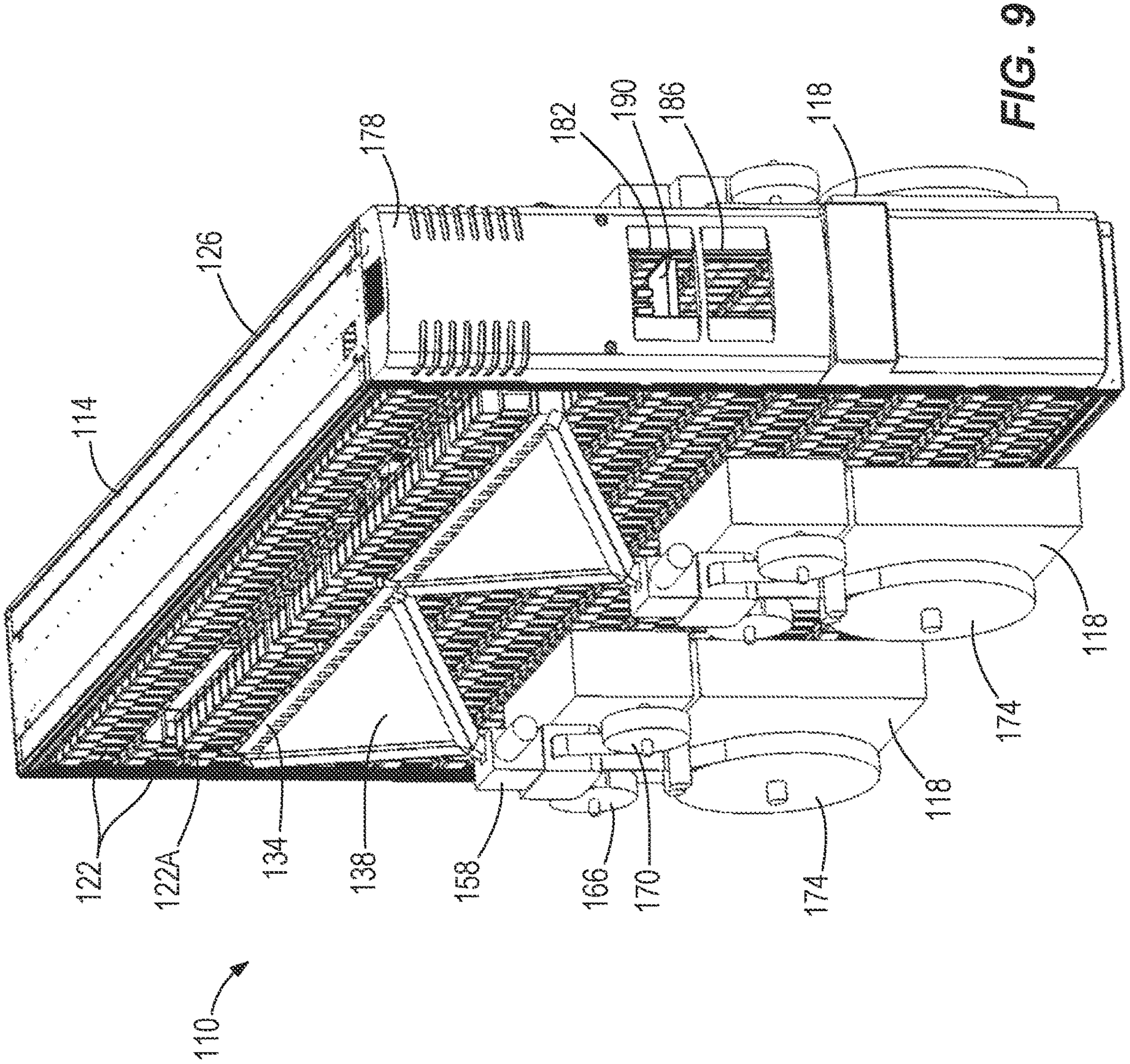
FIG. 9 is a front perspective view of the pharmacy packaging system shown in FIG. 5.

As shown in FIGS. 8 and 9, the packaging system 110 also includes a refill unit 178 coupled to the storage unit 114. The refill unit 178 includes an input port 182 and an output port 186. When a canister 122 is empty, the gantry assembly 130 can move the canister 122 to the output port 186. The control system may notify a user that a canister is in the output port 186 with an audible noise, email, or other alert. The user can then remove the canister 122 from the output port 186, fill the canister 122 with suitable pharmaceuticals, and return the filled canister 122 to the system through the input port 182. The illustrated input port 182 includes an internal scale 190 that weighs the filled canister 122 to determine how many pharmaceuticals were added to the canister 122. The scale 190 may be internal to the packaging system 110 to inhibit tampering, air flow, and the like from disturbing the canisters 122 while being weighed In some embodiments, the refill unit 178 may also include bar code scanners that automatically scan the canister 122 as it is removed from and returned to the system 110. Such an arrangement limits the number of canisters being removed from the system 110 at a time to reduce the possibility of refilling error. In addition, such an arrangement allows a user to easily access any of the canisters 122 within the system 110 without having to use a ladder or stool to reach the top row of canisters. In some embodiments, the canisters 122 also include RFID tags which can be read at each port 182, 186, as well as the filling stations, to help track the canisters 122 within the packaging system 110.

In other embodiments, a particular area (e.g., a portion of some rows and/or columns) within the storage unit 114 may be designated as the refill area. In such embodiments, the gantry assembly 130 may move empty canisters 122 to this area for refilling by a user. When a filled canister is placed in the refill area, a user may interact with the control system to notify the system 110 of the location of the filled canister and the type/number of pharmaceuticals contained therein. The gantry assembly 130 may carry the canister from the refill area to its proper location within the storage unit 114.

In some embodiments, one motor base 134, one manifold 138, and one packaging unit 118 may operate together as a standalone packaging system. Such a system has a relatively small footprint for use in lower volume pharmacies or facilities. In these embodiments, a user may manually place and remove canisters 122 on the motor base 134, as needed, to package pharmaceuticals using the packaging unit 118. In addition, the motor base 134 may be moved relatively lower and/or divided into multiple rows to facilitate access by a user.

FIGS. 10-15 illustrate another embodiment of a packaging unit 218 for use with the packaging system 110. Similar to the packaging unit 118 discussed above, the illustrated packaging unit 218 includes a motor base 222, a manifold 226, a receptacle 230, two feed stock rolls 234, 238, and a take-up roll 242.

Figure 10:
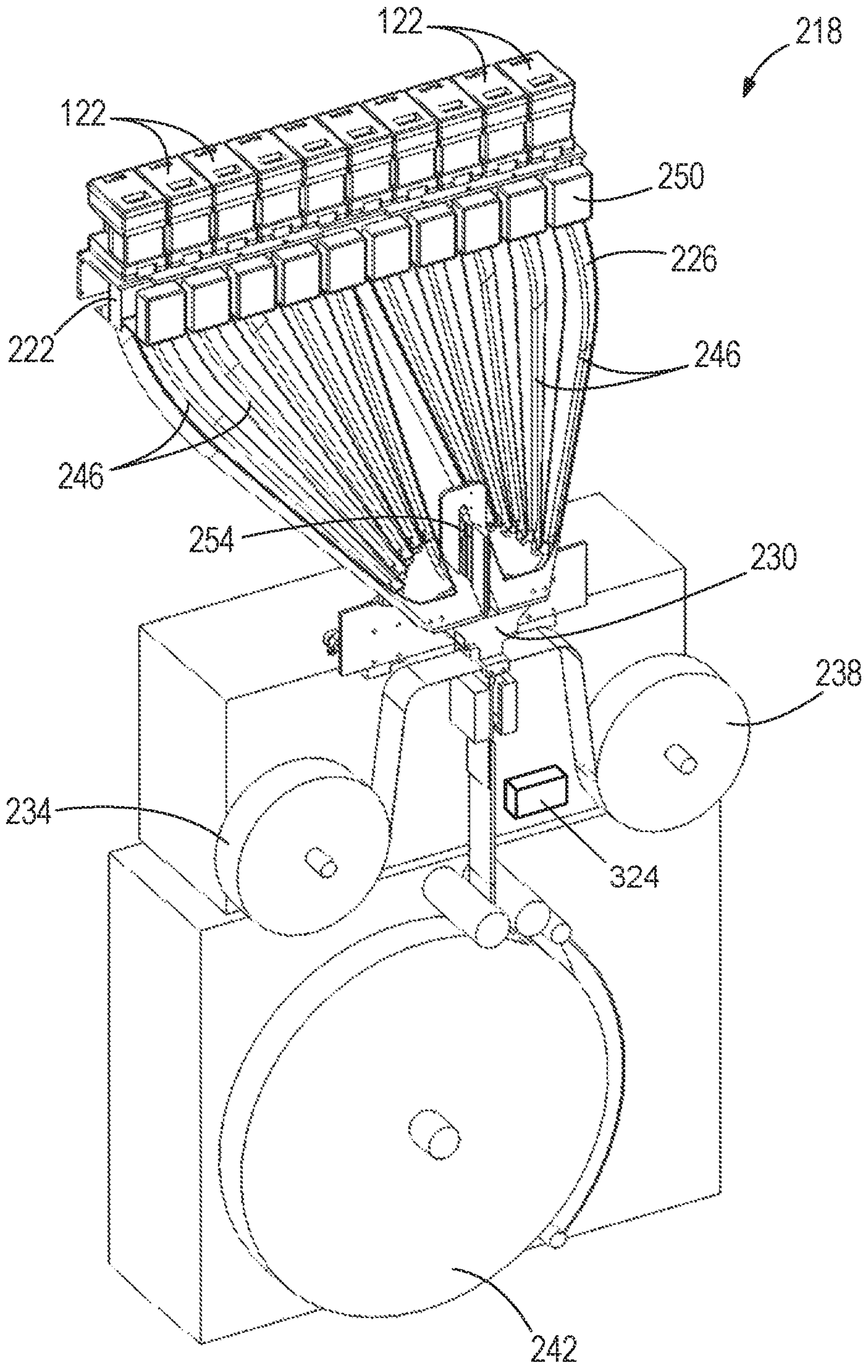
FIG. 10 illustrates another embodiment of a packaging unit for use with the packaging system shown in FIG. 5.
Figure 11:
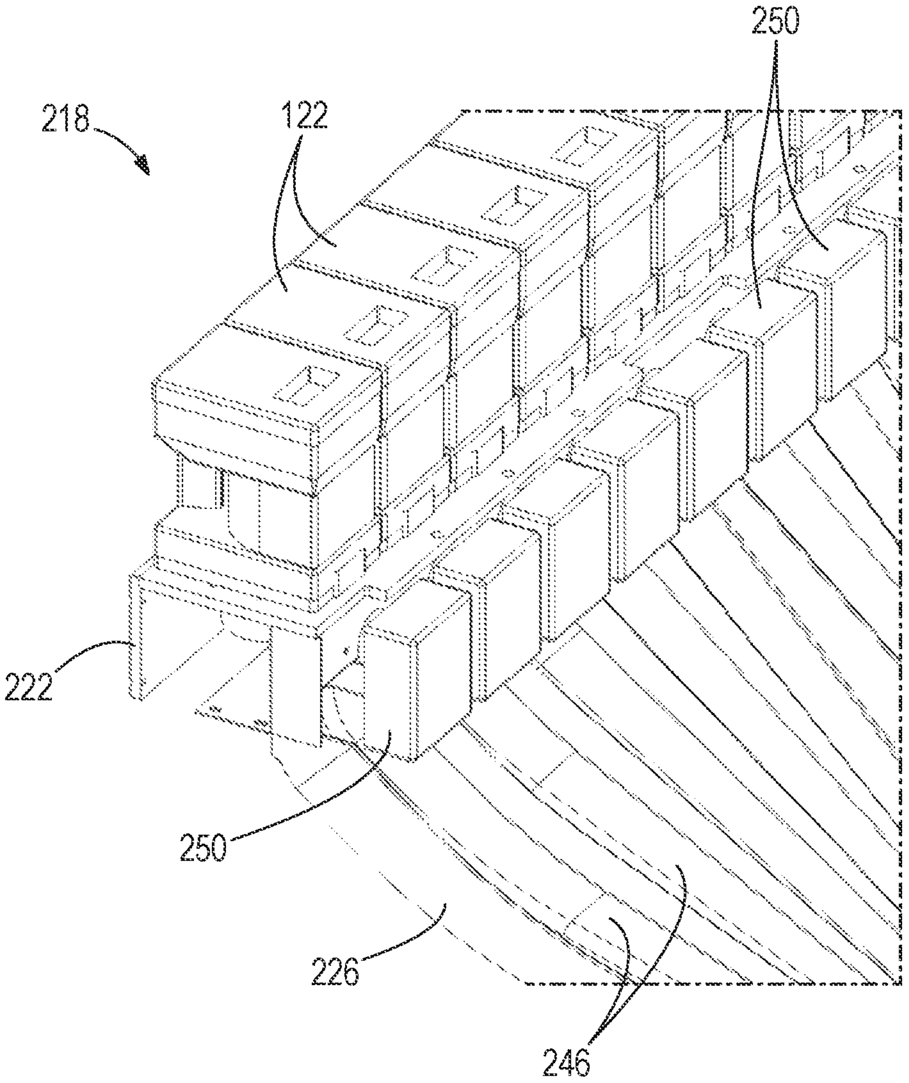
FIGS. 11 and 12 illustrate a portion of the packaging unit of FIG. 10 including a motor base and a manifold.
Figure 12:
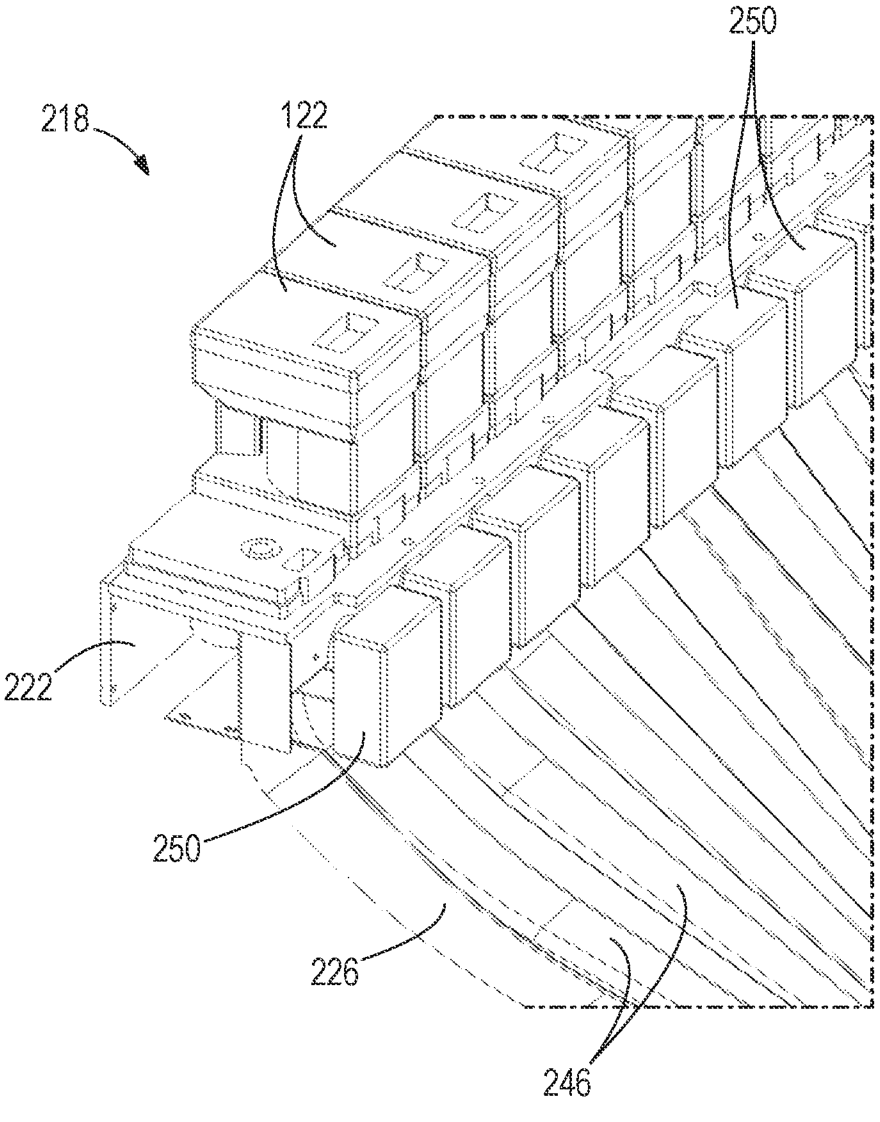

As shown in FIGS. 10-12, the manifold 226 includes a plurality of discrete tracks 246 corresponding to each of the canisters 122 mounted on the motor base 222. The illustrated tracks 246 are independent channels that together form the manifold 226. The tracks 246 isolate the pharmaceuticals from each other as the pharmaceuticals slide down the manifold to the receptacle.

As shown in FIGS. 11 and 12, cameras 250 are mounted to the motor base 222 adjacent outlets in the base 222. Each camera 250 is associated with one of the canisters 122 supported on the base 222. The cameras 250 are operable to determine whether the proper number and/or type of pharmaceuticals are being dispensed from the canisters 122. The cameras 250 capture images of pharmaceuticals exiting the motor base 222 and compare features (e.g., color, contour, size, shape, inscription, etc.) of the pharmaceuticals to stored images of known pharmaceuticals. In some embodiments, recognition software may be employed to automatically compare the images captured by the cameras 250 to stored images. In other embodiments, the captured images may be transmitted to a remotely-located pharmacist or technician who analyzes the images and verifies that the correct number and type of pharmaceuticals were dispensed. In further embodiments, the cameras 250 may be infrared sensors that only detect whether an object (e.g., a pill) drops through the motor base 22, rather than identifying the particular type of pharmaceutical.

Figure 13:
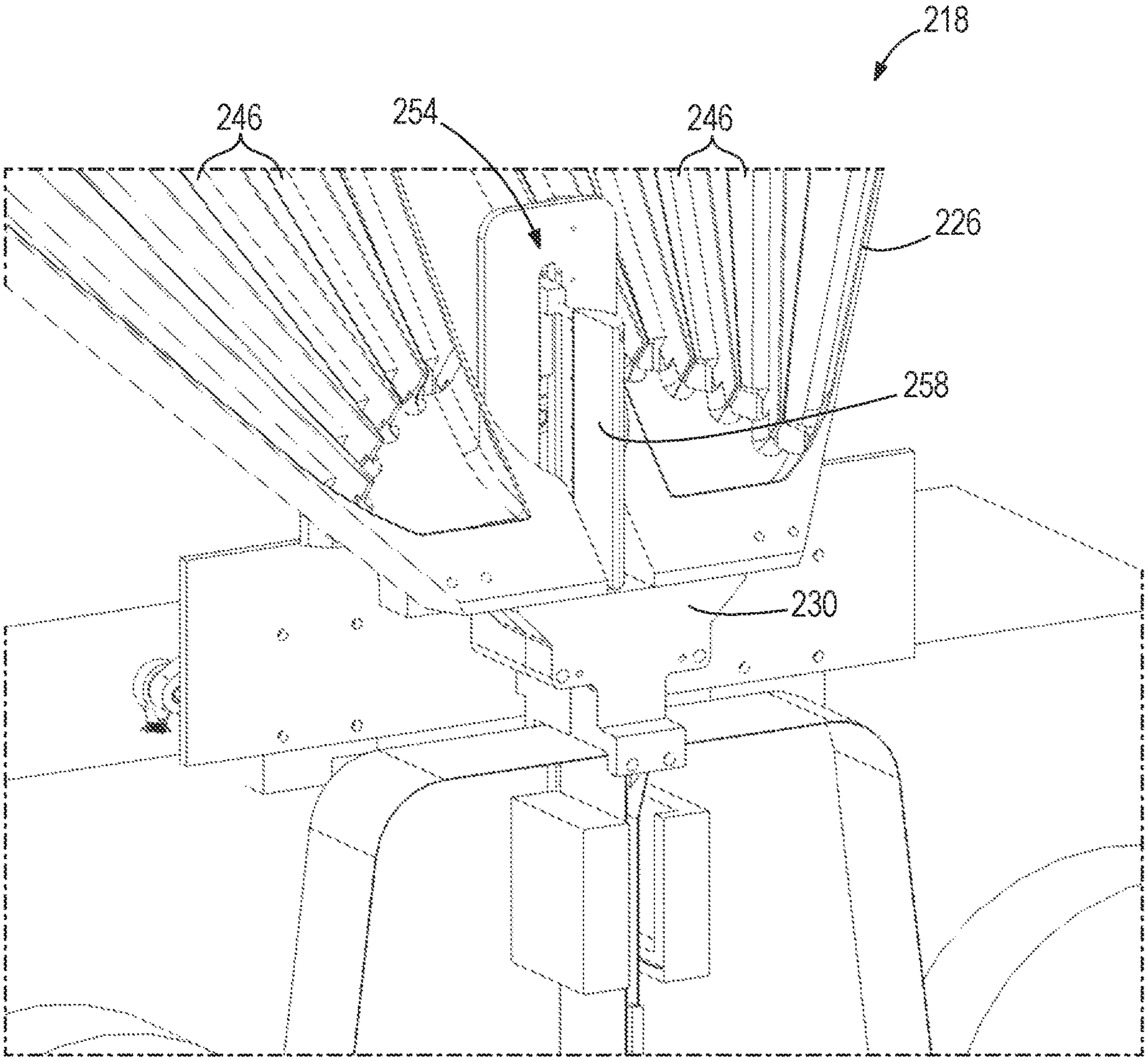
FIGS. 13-15 illustrate another portion of the packaging unit of FIG. 10 including the manifold, a receptacle, and a valve mechanism.
Figure 14:
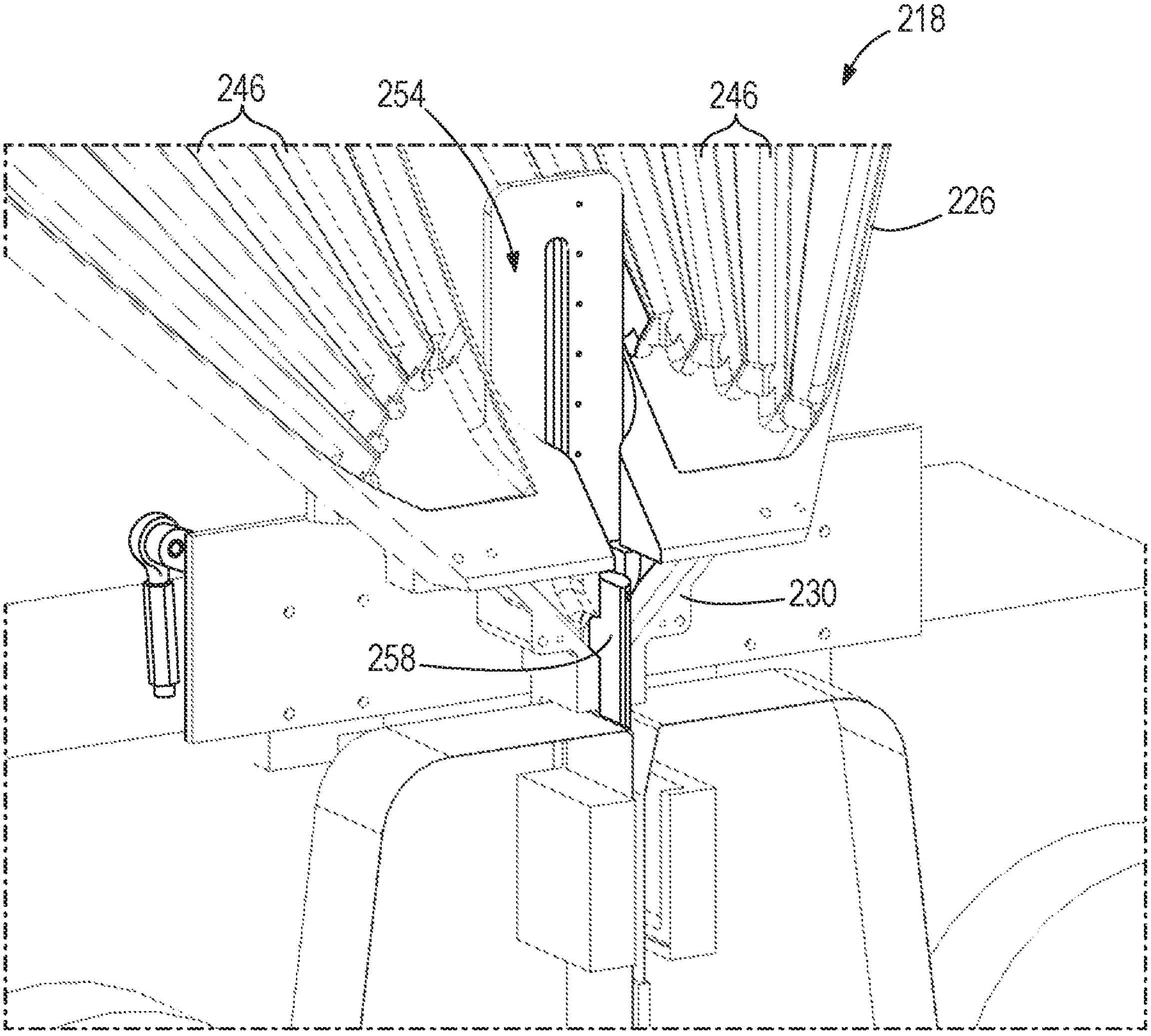
Figure 15:
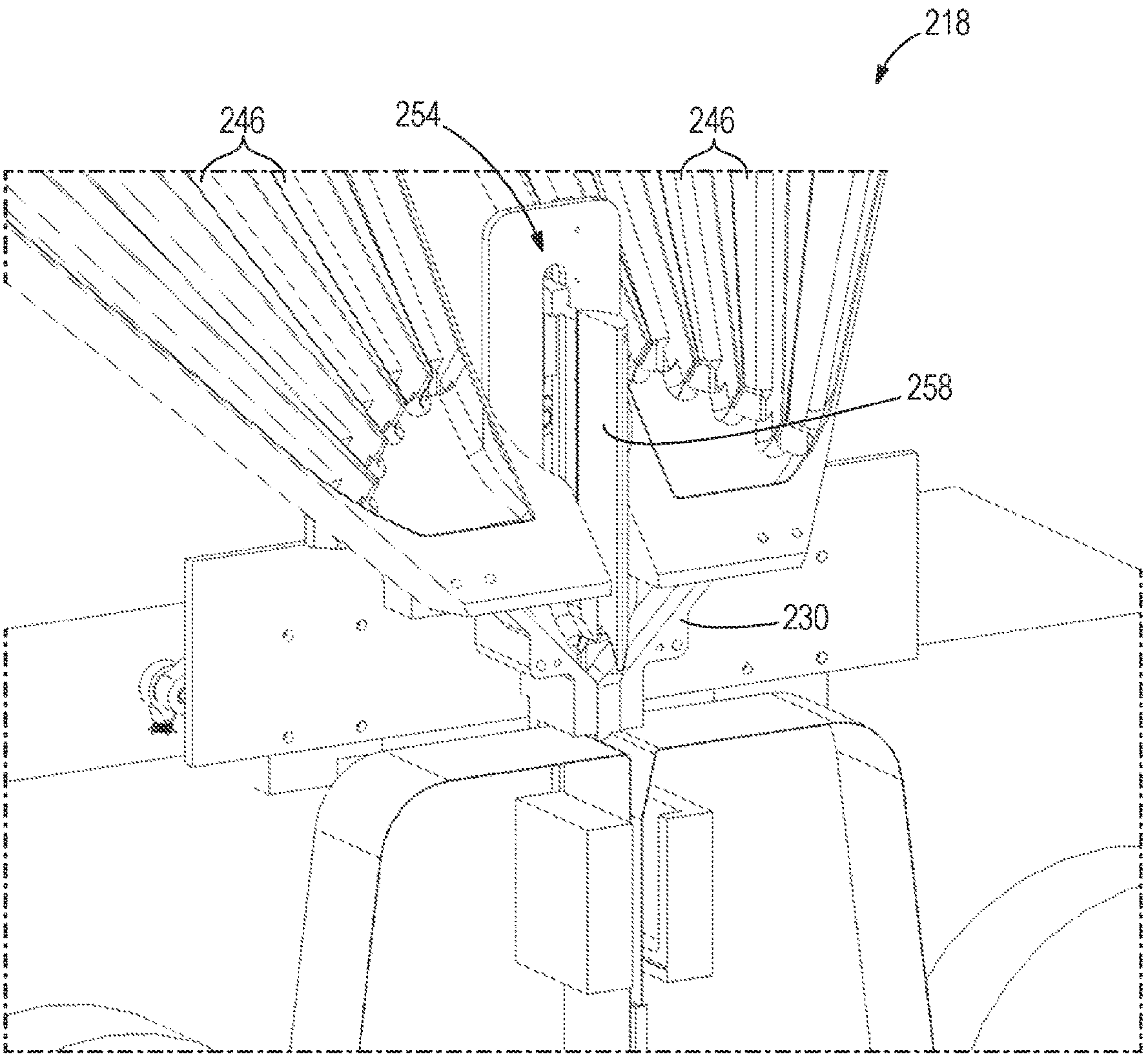

As shown in FIGS. 13-15, the receptacle 230 receives the pharmaceuticals from each of the tracks 246 in the manifold 226. In the illustrated embodiment, the receptacle 230 includes a shutter or valve mechanism 254 that temporarily stops the pharmaceuticals before the pharmaceuticals are collected in a pouch by the feed stock rolls 234, 238. The illustrated shutter mechanism 254 includes a plunger or pushrod 258 that is movable between a first or lowered position (FIG. 14) and a second or raised position (FIG. 15). When in the lowered position, the plunger 258 blocks the pharmaceuticals from traveling out of the manifold 226. When in the raised position, the plunger 258 is moved out of the way to allow the pharmaceuticals to pass toward the packaging equipment (e.g., the feed stock rolls 234, 238). In some embodiments, the shutter mechanism 254 may include a solenoid or other suitable actuator to raise and lower the plunger 258.

In operation, the plunger 258 is initially in the lowered position (FIG. 14) to temporarily stop the pharmaceuticals. The plunger 258 remains in this position until all the requested pharmaceuticals are gathered in the receptacle 230. If an excess or incorrect pharmaceutical is dispensed from the canisters 122 (which may be determined by the cameras 250), a gust of air, deflector, or trapdoor may be employed to remove that pharmaceutical from the receptacle 230 or from the manifold 226 before the pharmaceutical reaches the receptacle 230. In some embodiments, detecting whether an excess or incorrect pharmaceutical may include inspecting a pharmaceutical when the pharmaceutical is in flight (e.g., dropping from the motor base 222 into the manifold 226) as it is released from a canister 122. The cameras 250 mounted on the motor base 222 may be used to identify each dispensed pharmaceutical, for example, by reading an inscription on the pill. The cameras 250 may be high-speed camera and may include prisms and/or mirrors to capture an all-around image of a dispensed pharmaceutical. The control system may then process the image captured by the high-speed camera 250 to determine whether a correct or intact pharmaceutical was dispensed from the canisters 122. Once the proper pharmaceuticals are within the receptacle 230, the plunger 258 is actuated to the raised position (FIG. 15) such that the pharmaceuticals can be packaged in a pouch. The plunger 258 is then re-actuated to the lowered position to help push the pharmaceuticals into the pouch and await the next batch of pharmaceuticals.

Figure 16:
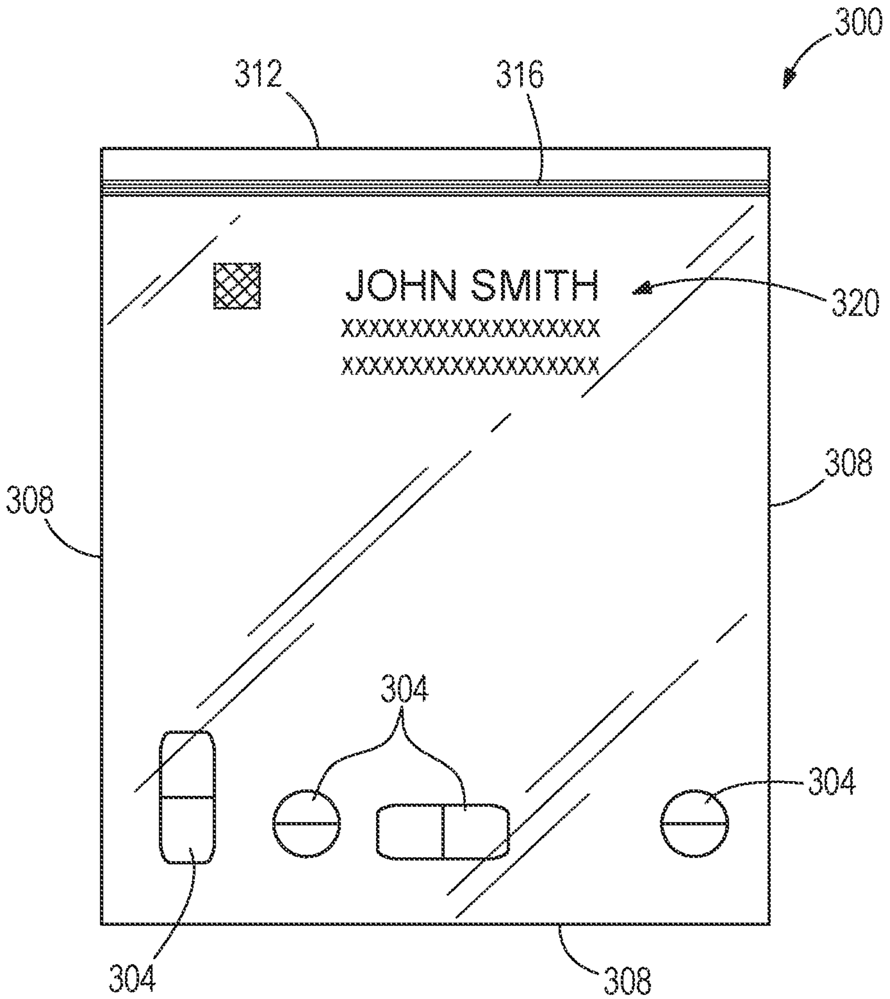
FIG. 16 illustrates a pouch with pharmaceuticals packaged inside.

FIG. 16 illustrates a pouch 300 containing different pharmaceuticals 304 therein. The illustrated pouch 300 is an example of a pouch that may be formed using the packaging equipment of the packaging units 18, 118, 218 described above. The pouch 300 is a clear plastic (e.g., cellophane) bag having three closed edges 308 and an open edge 312. A heat seal 316 extends across the pouch 300 adjacent the open edge 312 to seal the pouch 300. In some embodiments, all four edges 308, 312 of the pouch 300 may be closed via heat seals. Additionally or alternatively, the pouch 300 may be composed of an opaque and/or non-plastic material. For example, one or both sides of the material may be opaque or colored (e.g., amber colored). As discussed above, identification indicia 320 (e.g., a patient's name, a barcode, types of pharmaceuticals, etc.) are printed on the pouch 300 using, for example, a thermal printer, an inkjet printer, a thermal transfer ribbon, or the like. In other embodiments, the identification indicia 320 may be printed on a label that is coupled to the pouch 300 with adhesives. In further embodiments, the pouch 300 may include a header area and/or a footer area without medication, but that provides space to print or apply the indicia 320. In some embodiments, the packaging unit 218 may dispense empty (i.e., non-filled) pouches including certain information for a patient. The information may include, for example, instructions on how or when to take the pharmaceuticals, reminders to get new batch of pharmaceuticals, or the like.

Referring back to FIG. 10, the packaging unit 218 also includes a visual inspection system 324. The illustrated visual inspection system 324 is mounted to the packaging equipment, rather than the motor base 222. The visual inspection system 324 includes a camera or other suitable sensor. The camera looks at the contents of each pouch 300 after the pouches 300 are filled. The camera also looks at the indicia 320 (e.g., a barcode) printed on each pouch 300. The system 324 can then compare the detected pouch contents to the expected pouch contents to verify whether the pouch 300 was filled correctly. This arrangement allows the packaging unit 218 to inspect the pouches 300 in real time. The packaging unit 218 can make corrections, stop operation, and/or notify a user if errors are detected. In the illustrated embodiment, the visual inspection system 324 is located on one side of the packaging strip. In this arrangement, the visual inspection system 324 can infer the indicia 320 on the pouch 300 by knowing what was printed and tracking the location of the packaging strip. Alternatively, if the pouch 300 is made of clear material, the camera of the visual inspection system 324 can look through the pouch 300 to read the indicia. In such embodiments, the visual inspection system 324 may include a processor with software or firmware that reverses and interprets the indicia 320. In other embodiments, the visual inspection system 324 may include two cameras located on both sides of the packaging strip (e.g., one camera to verify the contents of the pouch 300, and one camera to read the indicia 320). In further embodiments, a mirror may be mounted to the packaging equipment so that the camera of the visual inspection system 324 can see around and on both sides of the packaging strip.

The visual inspection system 324 may be used in conjunction with or independently of the cameras 250 on the motor base 222. As noted above, the cameras 250 view the pharmaceuticals as the pharmaceuticals are released by the motor base 222. Since the pharmaceuticals are released in a controlled manner (e.g., without many other pharmaceuticals around) and the cameras 250 are not looking through other materials (e.g., the plastic packaging of the pouch 300), the cameras 250 can accurately view and determine the inscriptions on the pharmaceuticals (rather than simply relying on shape, color, etc.). The cameras 250 thereby identify each pharmaceutical as the pharmaceuticals are released into the manifold 226. The visual inspection system 324 communicates with the cameras 250 to determine which pharmaceuticals are expected in the pouch 300. The system 324 then verifies that all of the pharmaceuticals reached the pouch 300.

Figure 18:
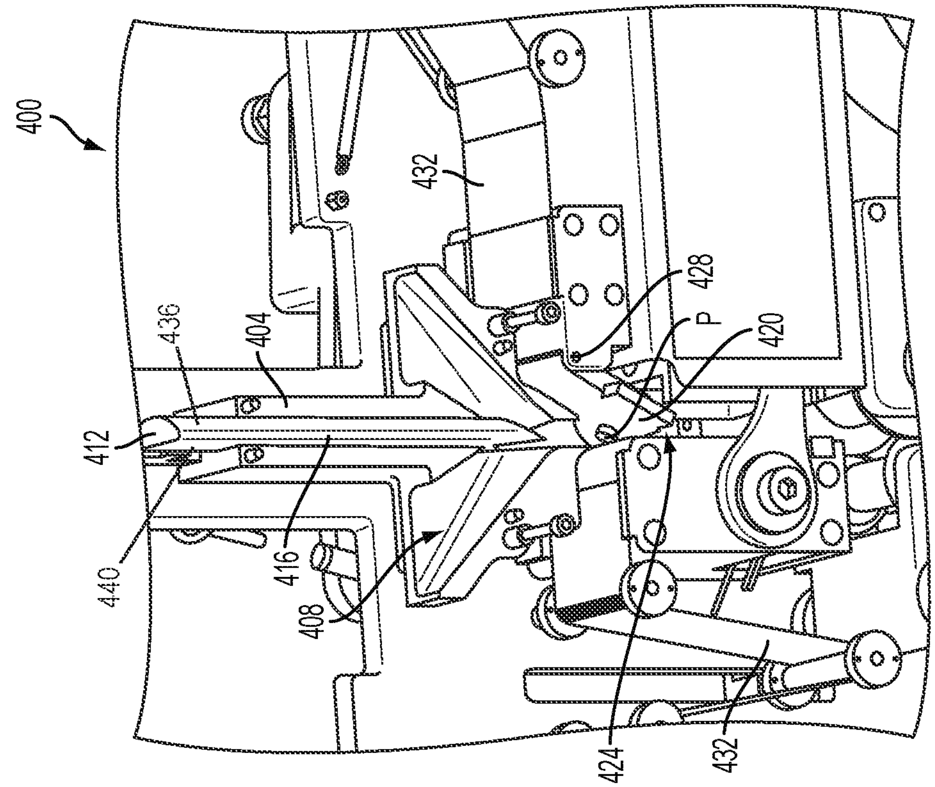
FIG. 18 illustrates the portion of the packaging unit of FIG. 17 with the valve mechanism in a second position.
Figure 17:
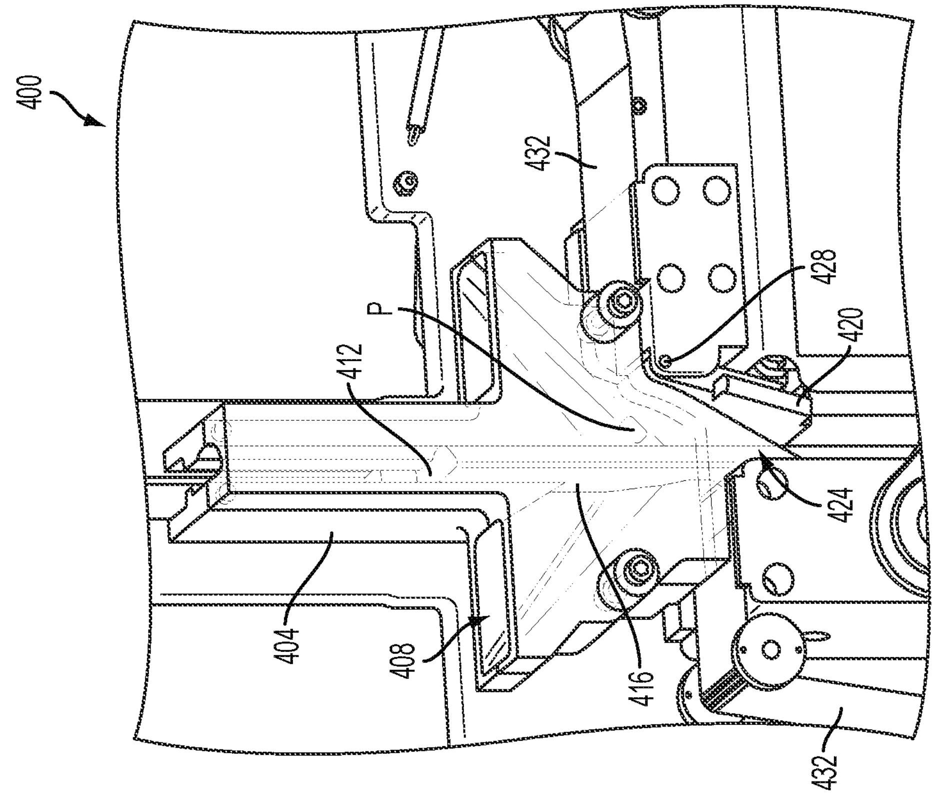
FIG. 17 illustrates a portion of another packaging unit for use in the pharmacy packaging system, the packaging unit including a valve mechanism in a first position.

FIGS. 17 and 18 illustrate a portion of another packaging unit 400 for use with the packaging system 110. The packaging unit 400 is similar to the packaging unit 218 discussed above. Reference is hereby made to the description of the packaging unit 218 above for description of features and elements of the packaging unit 400 not specifically discussed below.

In the illustrated embodiment, the packaging unit 400 includes a receptacle 404 to control pharmaceuticals (e.g., pills P) as the pharmaceuticals are packaged into a pouch (e.g., the pouch 300 shown in FIG. 16). The receptacle 404 receives pharmaceuticals from one or more tracks (e.g., the tracks 246 of the manifold 226 shown in FIG. 10) and directs the pharmaceuticals toward packaging equipment. As explained above, the packaging equipment can include two feed stock rolls and a take-up roll (e.g., the rolls 234, 238, 242 shown in FIG. 10) to form a pouch. In other embodiments, the packaging equipment can include a single feed stock roll. The receptacle 404 is located upstream of the packaging equipment to receive the pharmaceuticals from the track before the pharmaceuticals reach the packaging equipment.

The illustrated receptacle 404 includes a collection area 408 and a valve mechanism 412. The collection area 408 communicates with the track to receive pharmaceuticals. The valve mechanism 412 blocks the pharmaceuticals before the pharmaceuticals reach the packaging equipment. In the illustrated embodiment, the valve mechanism 412 includes a plunger or injector 416. The plunger 416 is movable relative to the track and the collection area 408 between a first or lowered position (FIG. 17) and a second or raised position (FIG. 18). When in the lowered position, the plunger 416 blocks the pharmaceuticals from moving out of the collection area 408 toward the packaging equipment. When in the raised position, the plunger 416 is moved out of the way to allow the pharmaceuticals to pass toward the packaging equipment. In the illustrated embodiment, the plunger 416 slides linearly between the lowered and raised positions. In some embodiments, the valve mechanism 412 may include a solenoid or other suitable actuator to raise and lower the plunger 416.

The illustrated receptacle 404 also includes a flapper 420. The flapper 420 is located downstream of the collection area 408. The flapper 420 helps manage material 432 being released by the feed stock rolls of the packaging equipment to form pouches. In particular, the flapper 420 extends into a path 424 between the collection area 408 and the packaging equipment and engages the material 432 to inhibit the material 432 from being torn or from binding. In addition, the flapper 420 helps hold edges of the material 432 close to each other for sealing. In the illustrated embodiment, the flapper 420 is pivotable relative to the path 424 about a pivot shaft 428. In other embodiments, the flapper 420 may move linearly relative to the path 424. In some embodiments, the flapper 420 may be biased by, for example, a spring, into the path 424.

In some embodiments, the flapper 420 may also selectively block the path 424 between the collection area 408 and the packaging equipment. When the plunger 416 is in the raised position (FIG. 18), the illustrated flapper 420 extends into the path 424 between the receptacle 404 and the packaging equipment. In this position, the pharmaceuticals are held above a pouch before the pharmaceuticals are loaded into the pouch. When the plunger 416 is in the lowered position (FIG. 17), the flapper 420 is moved out of the path 424, allowing the plunger 416 to extend through the path 424. If a pharmaceutical was being held on the flapper 420 before the plunger 416 moved to the lowered position, the pharmaceutical is also forced by the plunger 416 into the pouch formed by the packaging equipment. When the plunger 416 is moved back to the raised position, the leading edge of the flapper 420 pushes the two halves of the pouch (i.e., the two strips of material 432) flat against each other.

In other embodiments, the flapper 420 may include a carve-out or recess along its leading edge. The carve-out may generally match the shape and contour of the plunger 416. The carve-out provides a hole for pharmaceuticals to move into a pouch without being blocked by the flapper 420. In such embodiments, the flapper 420 does not pinch the two sides of the pouch tight against each other along an entire edge, but only pushes the two side edges of the pouch close together so the upper edge of the pouch can be closed.

In some embodiments, the plunger 416 is held between the material 432 as the pouch is being formed. More particularly, the pouch is formed by sealing (e.g., heat sealing) the two strips of material 432 along three edges (e.g., the bottom edge and the two side edges). This sealing process can be performed in a single step using a U-shaped sealing mechanism. Before the two strips of material 432 are sealed together, the plunger 416 is positioned between the strips of material 432. The sealing mechanism then creates the seal around the plunger 416. By creating the seal around the plunger 416, the two strips of material 432 are connected together, but do not lie flat against each other. When the plunger 416 is moved to the raised position (FIG. 18), the plunger 416 moves out from between the two strips of material 432, and the pouch is left open at the top. As further explained below, the plunger 416 can be moved back to the lowered position (FIG. 17) to help push the pharmaceuticals into the pouch. The two strips of material 432 can then be advanced so that the plunger 416 is between upstream sections of the material 432. When the next pouch is ready to be formed, the U-shaped sealing mechanism can again seal the two strips of material 432 along three edges. The bottom seal of this pouch becomes the top seal of the previous pouch. A cutting mechanism can then create, at generally the same time and stroke, a line of serrations through the bottom/top seal between pouches to facilitate later separating the pouches. Alternatively, the cutting mechanism can cut apart the pouches at the seal as the pouches are completed.

Figure 19:
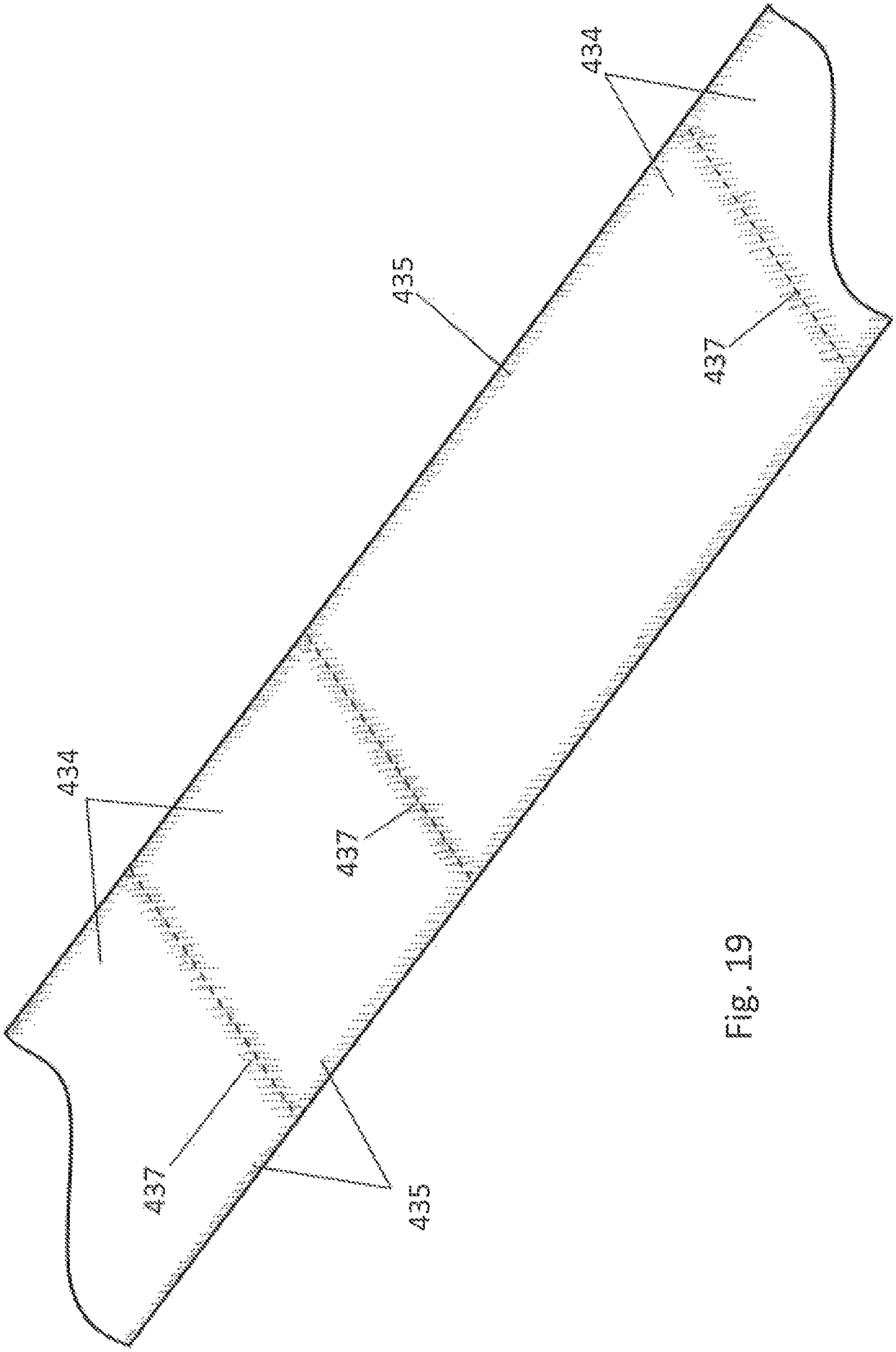
FIG. 19 illustrates a series of pouches formed using the packaging unit of FIG. 10.

FIG. 19 illustrates part of a series or strip of pouches 434 created using the packaging unit 400. The pouches 434 that are sealed along all four edges with heat seals 435. Serrations 437 are formed in the heat seals 435 between the pouches 434 to facilitate separating the pouches 434. As shown in FIG. 19, the pouches can be different lengths to accommodate, for example, different amounts of pharmaceuticals.

Referring back to FIGS. 17 and 18, in operation, the valve mechanism 412 physically pushes pharmaceuticals into a pouch to load the pouch, rather than relying on gravity for the pharmaceuticals to fall into the pouch. In particular, the plunger 416 of the valve mechanism 412 is initially in the lowered position (FIG. 17) as the receptacle 404 receives pharmaceuticals from the track. While in the lowered position, the plunger 416 blocks pharmaceuticals from traveling to the packaging equipment so that all of the pharmaceuticals are first collected in the collection area 408. Blocking the pharmaceuticals with the valve mechanism 412 allows the pharmaceuticals to settle together toward the bottom of the collection area 408 while the previous pouch is still being sealed. The valve mechanism 412 inhibits the pharmaceuticals from going into the wrong pouch. The valve mechanism 412, thereby, increases the accuracy and speed of the packaging unit 400 and provides error prevention. The valve mechanism 412 also inhibits the pharmaceuticals from being crushed or damaged in the sealing area of the pouches by the sealing mechanism. Additionally, the pouch is advanced at generally the same speed as the valve mechanism 412 to inhibit the valve mechanism from damaging the pharmaceuticals or the pouch.

During this time, each feed stock roll of the packaging equipment releases material 432 to form a pouch. The material 432 from each feed stock roll forms half of the pouch. The two halves are secured together along three sides or edges (e.g., the bottom and the two sides) to close the sides and form the pouch. In the illustrated embodiment, the sides of the pouch are closed by, for example, heat sealing. Because the pouches are made on-demand from feed stock rolls, the pouches can be made variable in length (e.g., longer or shorter), as shown in FIG. 19, depending on the amount of pharmaceuticals being packaged. For example, pouches are made having lengths between about 1 inch and about 3¼ inches, although other lengths of pouches are also possible. The length of the pouch may be determined automatically by the packaging equipment based on the amount of pharmaceuticals expected to be loaded into the pouch, and the area needed to print indicia and other information on the pouch. The amount of material needed to form a particular pouch can be identified on the material 432 by an indexing mark (e.g., a black line) drawn on the material 432. Once the packaging equipment sees this mark, the feed stock rolls stop releasing material 432. In embodiments where the packaging equipment only includes a single feed stock roll, the material 432 from the single roll may be folded along one side or edge to close the edge. In either embodiment, the material 432 may be pre-printed with indicia regarding the pharmaceuticals and patient. After the pouch is initially formed, one of the heat sealing elements is moved away from the material 432. This action causes the pouch to open along its upper, unclosed edge.

The illustrated plunger 416 also helps form and shape the pouch. When the plunger 416 is in the lowered position, the plunger 416 is located between the two strips of material 432 that form the pouches. The material 432 can be closed (e.g., heat sealed) along three edges (e.g., the bottom and two sides) to form the initial shape of the pouch. In the illustrated embodiment, the plunger 416 includes a substantially curved outer surface 436 on one side and a substantially flat outer surface 440 on the opposite side. The curved outer surface 436 shapes one of the strips of material 432 in an arch relative to the other strip of material 432. This arrangement causes the arched strip of material 432 to not lie flat against the other strip of material 432, making it easier for pharmaceuticals to fill the pouch. In addition, when the plunger 416 is removed from the pouch, a hole or gap is left between upper edges of the material 432, allowing the pharmaceuticals to more easily move into the pouch.

In some embodiments, once the pouch is formed around the plunger 416, the plunger 416 moves to the raised position (FIG. 18). The pharmaceuticals are then released from the respective canisters 122. The pharmaceuticals fall through the manifold 226 and into the pouch due to gravity. The plunger 416 moves to a second position at the top of the pouch where the opening is formed to help push the pharmaceuticals into the pouch. The plunger 416 then moves to the lowered position (FIG. 17) and the material 432 is advanced by the packaging equipment at generally the same speed that the plunger 416 moves. When the plunger 416 is in the lowered position (FIG. 17), the top of the pouch is sealed along with the sides of a new pouch as described below.

In other embodiments, once all of the required pharmaceuticals are collected in the collection area 408 and the pouch is formed, the plunger 416 moves to the raised position (FIG. 18). The pharmaceuticals then fall out of the collection area 408 toward the flapper 420, which in some embodiments blocks the path 424 to the packaging equipment. The plunger 416 then moves back to the lowered position (FIG. 17) to help push the pharmaceuticals into the pouch. The material 432 is advanced by the packaging equipment at generally the same speed that the plunger 416 moves so the plunger 416 does not crush or damage the pharmaceuticals, particularly if the pouch is being filled with many pharmaceuticals (e.g., 15-20 pills, or more). Instead, the plunger 416 pushes the pharmaceuticals to move the pharmaceuticals past and out of the way of the sealing mechanism so the sealing mechanism can make the top seal in the pouch. In some embodiments, the plunger 416 may also actuate a cam-type mechanism that moves the flapper 420 slightly ahead of movement of the plunger 416. By helping push the pharmaceuticals into the pouch with the plunger 416, more pharmaceuticals can be loaded into the pouch more reliably. For example, in some embodiments, the plunger 416 may be used to move 10-40 pharmaceuticals into a single pouch. Such volume of pharmaceutical loading into a pouch may not be attainable by relying on gravity alone. In addition, such an arrangement allows more pharmaceuticals to be loaded into a single pouch than conventional devices, which reduces the possibility of confusing a patient by providing all of the pharmaceuticals in a single pouch (rather than multiple pouches each containing a small number of pills).

As the pharmaceuticals are loaded into the pouch by the plunger 416, the material 432 is advanced to begin forming the next pouch around the plunger 416. The flapper 420 is pivoted toward the plunger 416 to help hold edges of the material 432 together. Once the material 432 is sufficiently advanced by the feed stock rolls, a fourth side or edge (e.g., the top) of the pouch is closed by the sealing mechanism. Similar to the other sides, the fourth side of the pouch may be closed by, for example, heat sealing. As noted above, the seal forming the fourth (or top) side of the pouch may also form the bottom seal of the next pouch. This process is continued to create a series of discrete pouches, as shown in FIG. 19.

The receptacle 404 of the packaging unit 400 facilitates loading pharmaceuticals into pouches more accurately, faster, and at a higher capacity than packaging units which rely on gravity feed. As such, the pouches can be filled more reliably.

In some embodiments, the packaging unit 400 may further include a secondary staging area located upstream of the collection area 408 of the receptacle 404. The secondary staging area may include a valve mechanism or flapper that temporarily stops pharmaceuticals to create a delay as the pharmaceuticals travel from the track to the receptacle 404. As such, if the packaging unit 400 determines (via a sensor or camera) that an improper pharmaceutical was dispensed, the second staging area can remove the unwanted pharmaceutical before the pharmaceutical reaches the collection area. In some embodiments, the secondary staging area may remove the unwanted pharmaceutical by pushing the pharmaceutical away with the valve mechanism. In other embodiments, the secondary staging area may remove the unwanted pharmaceutical with a focused gust of air. If the pharmaceutical is verified as being correct, the valve mechanism 412 can open to allow the pharmaceutical to pass into the collection area 408 of the receptacle 404.

Various features and advantages of the invention are set forth in the following claims.

What is claimed is:

1. A packaging unit for packaging pharmaceuticals into a pouch, the packaging unit comprising:
- packaging equipment including a feed stock roll to form pouches; and
- an electronic processor electrically coupled to the packaging equipment and configured to:
  - determine an amount of pharmaceuticals being loaded into the pouch;

determine a length of the pouch based on the amount of pharmaceuticals; and control the packaging equipment to form the pouch having the length, wherein the electronic processor is configured to identify the amount of material needed for the pouch by drawing an indexing mark on the material corresponding to the length of the pouch, wherein the electronic processor is configured to detect the indexing mark, wherein the electronic processor is configured to control the feed stock roll to stop releasing material in response to detecting the indexing mark.

2. The packaging unit of claim 1, wherein the electronic processor is further configured to receive an input specifying the amount of pharmaceuticals.

3. The packaging unit of claim 1, wherein the feed stock roll is a first feed stock roll and wherein the packaging equipment includes a second feed stock roll, wherein a first material from the first feed stock roll forms a first half of the pouch and a second material from the second feed stock roll forms a second half of the pouch.

4. The packaging unit of claim 1, wherein the feed stock roll releases a material to form the pouch.

5. The packaging unit of claim 4, wherein the material is folded along an edge to form the pouch, wherein the material forms a series of pouches including a first pouch having a first length coupled to a second pouch having a second length different from the first length.

6. The packaging unit of claim 1, wherein the pouch includes printed indicia, wherein the pouch includes a first portion configured to include the printed indicia and a second portion without the printed indicia on a single side of the pouch.

7. The packaging unit of claim 6, wherein the indicia is printed on a label adhesively coupled to the pouch.

8. The packaging unit of claim 1, wherein the length of the pouch is between 1 inch and 3¼ inches.

9. The packaging unit of claim 1, wherein the packaging unit includes a cutting mechanism configured to create a line of serrations between pouches.

10. A method of packaging pharmaceuticals into a pouch using a packaging unit, the packaging unit including packaging equipment, the method comprising:

determining, using an electronic processor of the packaging unit, an amount of pharmaceuticals being loaded into the pouch;

determining, using the electronic processor, a length of the pouch based on the amount of pharmaceuticals; and controlling, using the electronic processor, the packaging equipment to form the pouch having the length;

releasing a material from a feed stock roll to form the pouch;

identifying, using the electronic processor, the amount of material needed for the pouch by drawing an indexing mark on the material corresponding to the length of the pouch;

detecting, using the electronic processor, the indexing mark; and controlling, using the electronic processor, the feed stock roll to stop releasing material in response to detecting the indexing mark.

11. The method of claim 10, further comprising receiving an input specifying the amount of pharmaceuticals.

12. The method of claim 10, further comprising releasing a material from a feed stock roll to form the pouch and further comprising folding the material along an edge to form the pouch.

13. The method of claim 10, further comprising releasing a first material from a first feed stock to form a first half of the pouch; and releasing a second material from a second feed stock roll to form a second half of the pouch.

14. The method of claim 10, wherein the length of the pouch is between 1 inch and 3¼ inches.

15. The method of claim 10, further comprising forming a series of pouches including a first pouch having a first length coupled to a second pouch having a second length different from the first length.

16. The packaging unit of claim 10, further comprising creating, using a cutting mechanism of the packaging unit, a line of serrations between pouches.

* * * * *